United States Patent
Kobayashi et al.

(10) Patent No.: US 10,128,485 B2
(45) Date of Patent: Nov. 13, 2018

(54) SEALED SECONDARY BATTERY

(75) Inventors: Keiichiro Kobayashi, Toyota (JP); Takanori Fukushi, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 423 days.

(21) Appl. No.: 14/398,223

(22) PCT Filed: May 2, 2012

(86) PCT No.: PCT/JP2012/061618
§ 371 (c)(1),
(2), (4) Date: Feb. 13, 2015

(87) PCT Pub. No.: WO2013/164897
PCT Pub. Date: Nov. 7, 2013

(65) Prior Publication Data
US 2015/0171411 A1    Jun. 18, 2015

(51) Int. Cl.
*H01M 2/34* (2006.01)
*H01M 2/22* (2006.01)
*H01M 10/34* (2006.01)

(52) U.S. Cl.
CPC ............ *H01M 2/345* (2013.01); *H01M 2/22* (2013.01); *H01M 10/34* (2013.01); *H01M 2200/20* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 4,025,696 A * | 5/1977 | Tucholski | H01M 2/34 429/58 |
| 5,691,073 A * | 11/1997 | Vu | H01H 37/043 429/170 |
| 5,741,606 A * | 4/1998 | Mayer | H01M 2/1229 429/53 |
| 5,766,790 A | 6/1998 | Kameishi et al. | |
| 6,204,635 B1 | 3/2001 | Sullivan | |
| 6,228,523 B1 * | 5/2001 | Azema | H01M 2/34 429/57 |

(Continued)

FOREIGN PATENT DOCUMENTS

CA    2099657 A1    2/1994
EP    0 739 047 A2    10/1996
(Continued)

*Primary Examiner* — Wojciech Haske
(74) *Attorney, Agent, or Firm* — Finnegan, Henderson, Farabow, Garrett & Dunner, LLP

(57) ABSTRACT

There is provided a sealed secondary battery whose current-blocking system yields little change in the actuation pressure even on long-term use. The sealed secondary battery comprises a current-blocking system 80 that is actuated by a pressure rise inside a battery case 12 to disconnect conduction path between an electrode and an electrode terminal. Current-blocking system 80 comprises a pressure-sensitive member having a pressure-sensitive deformable portion 32 that deforms from a first state via snap-through deformation to a second state upon a pressure rise inside battery case 12, and is configured to disconnect the conduction path by snap-through deformation of pressure-sensitive deformable portion 30.

17 Claims, 11 Drawing Sheets

(56) References Cited

U.S. PATENT DOCUMENTS

| | | |
|---|---|---|
| 2008/0038627 A1 | 2/2008 | Yamauchi et al. |
| 2008/0289945 A1* | 11/2008 | Brazier ............... H01M 2/1229 |
| | | 200/83 R |
| 2010/0178539 A1* | 7/2010 | Elia ..................... H01M 2/1241 |
| | | 429/56 |
| 2010/0233529 A1 | 9/2010 | Nansaka et al. |

FOREIGN PATENT DOCUMENTS

| | | |
|---|---|---|
| EP | 0 959 508 A1 | 11/1999 |
| JP | H05-062956 U | 8/1993 |
| JP | H06-196150 A | 7/1994 |
| JP | 8-64197 | 3/1996 |
| JP | 9-180698 | 7/1997 |
| JP | 2000-11989 | 1/2000 |
| JP | 2008-66254 | 3/2008 |
| JP | 2010-212034 | 9/2010 |

* cited by examiner

SEALED SECONDARY BATTERY

CROSS-REFERENCE TO RELATED APPLICATIONS

This application is a national phase application of International Application No. PCT/JP2012/061618, filed May 2, 2012, the content of which is incorporated herein by reference.

TECHNICAL FIELD

The present invention relates to a sealed secondary battery. In particular, it relates to a sealed secondary battery comprising a current-blocking system actuated by an increase in the internal pressure.

BACKGROUND ART

Secondary batteries such as lithium secondary batteries and nickel-hydrogen batteries are preferably used as so-called portable power supplies in personal computers, mobile devices, etc., or as vehicle-driving power supplies. In particular, lithium secondary batteries that are lightweight and have high energy densities have become increasingly important as high output power supplies for use on vehicles such as electric automobiles, hybrid mobiles and the like (e.g. as power sources to drive motors connected to drive wheels of vehicles).

Typical examples of such secondary batteries include a hermetic battery (sealed battery) obtainable by sealing an electrode unit having a positive electrode and a negative electrode along with an electrolyte in a battery case. When charging this type of battery, in the presence of a defective battery or when a malfunction is caused by a charging device failure, the battery may be supplied with a higher current than usual and fall in an overcharged state. Upon such overcharge, the battery reactions proceed rapidly, gas is produced inside the sealed battery case to increase the internal pressure (gas pressure) of the battery case, and the abnormal internal pressure may cause deformation of the case, etc. To deal with such an abnormal occasion, as a conventional technique, a battery configuration has been suggested to comprise a current-blocking system that uses the pressure inside the battery case, which increases in association with abnormalities occurring in the battery, to cause deformation of a component so that the conduction is physically cut off to block the current.

Conventional examples related to a secondary battery comprising such a current-blocking system include Patent Document 1. The current-blocking system in this document comprises a current collector in a rectangular plate form connected to an electrode unit, and an invertible plate welded to the current collector. When the pressure inside the battery case (internal pressure of the case) increases, the internal pressure of the case causes the invertible plate to move away from the current collector. The current-blocking system is configured such that when the internal pressure of the case increases to a preset pressure value, the invertible plate breaks off part of the current collector including the welded joint and deforms in a direction to move away from the current collector. Thus, with the current collector partially breaking off and separating along with the invertible plate from the main body of the current collector, the current is blocked. Other conventional examples include Patent Document 2.

CITATION LIST

Patent Literature

[Patent Document 1] Japanese Patent Application Publication No. 2010-212034
[Patent Document 2] Japanese Patent Application Publication No. 2008-66254

SUMMARY OF INVENTION

Technical Problem

In a current-blocking system configured as described in Patent Document 1, to allow proper actuation of the current-blocking system to block the current (in other words, to control the actuation pressure of the current-blocking system) when the case's preset internal pressure (i.e. a prescribed gas pressure value) is reached, measures have been taken, such as to form a groove (notch, typically a score provided during pressing of the current collector, etc.) at a location of the current collector to be broken off. By means of the position or cross-sectional shape of the groove, the force required to break off part of the current collector from the rest (i.e. the fracture strength of the current collector) is adjusted, whereby the actuation pressure of the current-blocking system can be set within a prescribed range.

Sealed secondary batteries installed in vehicles such as electric automobiles, hybrid automobiles (including plug-in hybrid automobiles) and the like (e.g. sealed secondary batteries used as driving power supplies in the vehicles) can be used over a prolonged period, incomparably to batteries used as power supplies in personal computers, mobile devices and the like (i.e. consumer batteries). This is because the lifetimes of automobiles and the like can reach 10 or more years (sometimes 20 or more years). Thus, current-blocking systems of sealed secondary batteries installed in vehicles are required, unlike which of the consumer batteries, to maintain a long-term ability to undergo proper actuation at a prescribed internal pressure of the case (over a preset range thereof).

The current-blocking system in which the actuation pressure is set up by the shape (e.g. the depth) of the groove as described above has a tendency such that the actuation pressure significantly changes from the initial value (actuation pressure value immediately after the production) when a sealed secondary battery comprising the current-blocking system is used over a prolonged period. One of the main causes can be a decrease in the fracture strength of the current collector plate due to long-term use of the battery. In other words, in a sealed secondary battery (especially, a battery, such as a lithium-ion secondary battery, comprising a non-aqueous electrolyte), a small amount of gas is produced even in normal charging and discharging modes of the battery, whereby the internal pressure of the case may somewhat increase. Although the pressure is much lower than the proper actuation pressure of the current-blocking system, the increase in the internal pressure of the case exerts some stress on the invertible plate and current collector welded to the invertible plate. When such stress is exerted over a prolonged period, the fracture strength of the current collector gradually decreases due to fatigue, creep and so on.

The present invention has been made in view of such circumstances, with an objective thereof being to provide a sealed secondary battery such that its current-blocking system yields little change in the actuation pressure even on long-term use.

Solution to Problem

The present inventors have conducted various investigations on current-blocking systems comprising a member (pressure-sensitive member) having a portion (a pressure-sensitive deformable portion) that undergoes deformation by an increase in the internal pressure of the case. They have discovered that the problem can be solved by configuring the current-blocking system such that during deformation of the pressure-sensitive deformable portion of the pressure-sensitive member, its shape undergoes snap-through phenomenon (i.e. snap-through deformation), and the current-blocking system blocks the current in association with the snap-through deformation; whereby the present invention has been completed.

The sealed secondary battery disclosed herein comprises a positive electrode, a negative electrode, and a battery case housing the positive electrode and the negative electrode. It further comprises an electrode terminal electrically connected to either the positive electrode or negative electrode. The electrode terminal is exposed outside the battery case. The sealed secondary battery further comprises a current-blocking system that is actuated by an increase in the pressure inside the battery case to disconnect conduction path between the electrode and the electrode terminal. The current-blocking system includes a pressure-sensitive member having a pressure-sensitive deformable portion in a plate form. Upon a pressure rise inside the battery case, the pressure-sensitive deformable portion deforms from a first state via snap-through deformation to a second state. The sealed secondary battery (or simply "secondary battery" hereinafter) is configured to disconnect the conduction path by snap-through deformation of the pressure-sensitive deformable portion. According to such a configuration, the snap-through phenomenon of the pressure-sensitive deformable portion's shape is used to disconnect the conduction path; and therefore, a change in the actuation pressure of the current-blocking system can be suppressed to a low level even on long-term use.

The art disclosed herein can be preferably implemented, for instance, in an embodiment where the conduction path comprises a first conductive member and a second conductive member. In a preferable embodiment, when the pressure-sensitive deformable portion is in the first state, the first conductive member is in direct connection to the second conductive member. The current-blocking system is configured to disconnect the conduction between the first conductive member and second conductive member by snap-through deformation of the pressure-sensitive deformable portion. A secondary battery having such a configuration may be suitable for quickly disconnecting the conduction path when the internal pressure of the case reaches the actuation pressure of the current-blocking system. In other words, it may be suitable for quickly actuating the current-blocking system when the internal pressure of the case reaches a prescribed pressure value.

In a preferable embodiment of the art disclosed herein, the pressure-sensitive deformable portion is provided to the first conductive member. In other words, in this embodiment, the first conductive member represents the pressure-sensitive member. In the first state, it is preferable that the pressure-sensitive deformable portion is in direct connection to the second conductive member. A secondary battery in such an embodiment can be suitable for quickly disconnecting the conduction path when the internal pressure of the case reaches a prescribed pressure value.

In the first state, the pressure-sensitive member is preferably joined (fixed) to the second conductive member. In a secondary battery comprising a current-blocking system in such an embodiment, the actuation pressure of the current-blocking system can be precisely controlled immediately after production (initially) over a long term.

In a preferable embodiment of the art disclosed herein, the pressure-sensitive member comprises a flange projecting outwards (in radially outer directions) from the periphery of the pressure-sensitive deformable portion. In the first state, the pressure-sensitive deformable portion forms a concavity curving inward toward inside of the battery from the flange. A pressure-sensitive member in such a shape is suitable for having a pressure-sensitive deformable portion to undergo proper snap-through deformation by means of a pressure rise inside the case.

From the standpoint of facilitating proper snap-through deformation at a prescribed actuation pressure, the pressure-sensitive deformable portion preferably has a circular periphery. In an embodiment where the pressure-sensitive member has a flange, the flange preferably has a circular outer rim. With respect to the pressure-sensitive member having such a pressure-sensitive deformable portion (concavity) and a flange, when a is the outer rim diameter (outer diameter) of the flange and b is the thickness of the pressure-sensitive member in the pressure-sensitive deformable portion, it is preferable to satisfy the next relationship (1): $b/a$ is 1.0% to 2.5%. In the pressure-sensitive member, when c is the depth of the concavity, it is preferable to satisfy the next relationship (2): $c/a$ is 3.0% to 7.0%. In the pressure-sensitive member, when d is the outer diameter of the pressure-sensitive deformable portion, it is preferable to satisfy the next relationship (3): $d/a$ is 50% to 90%. It is more preferable to satisfy at least two of the relationships (1) to (3). The respective combinations of (1) and (2), (1) and (3), and (2) and (3) are all preferable. It is particularly preferable to satisfy all the relationships (1) to (3). A pressure-sensitive member in such a shape is suitable for effecting snap-through deformation of the pressure-sensitive deformable portion at a suitable internal pressure of the case in a general lithium-ion secondary battery.

In a preferable embodiment, the pressure-sensitive deformable portion comprises a tapered portion narrowing from the periphery of the pressure-sensitive deformable portion toward the center thereof. The flange and the tapered portion preferably form an angle $\theta$ such that $\tan \theta = 0.04$ to 5.0. A pressure-sensitive member in such a shape is suitable for having a pressure-sensitive deformable portion to undergo snap-through deformation by means of a pressure rise inside the case.

In another preferable embodiment, the pressure-sensitive deformable portion is formed to have, in cross section, a dome shape (arched roof shape) curved inward toward inside of the battery. A pressure-sensitive member in such a shape is suitable for having a pressure-sensitive deformable portion to undergo snap-through deformation by means of a pressure rise inside the case. Preferable examples of the domed shape include the shape of a section cut out of a spherical shell.

In a current-blocking system disclosed herein, the pressure-sensitive member preferably has a thickness b larger than 0.15 mm in the pressure-sensitive deformable portion. A pressure-sensitive member having such a thickness is suitable for having a pressure-sensitive portion to undergo snap-through deformation at a suitable internal pressure of the case in a general lithium-ion secondary battery.

The art disclosed herein can be applied to various types of sealed secondary battery. Examples of preferable applications include a sealed secondary battery (e.g. a lithium secondary battery, typically a lithium-ion secondary battery) comprising a non-aqueous electrolyte (typically a non-aqueous electrolyte in a liquid form at normal temperature, i.e. a non-aqueous electrolyte solution).

A sealed secondary battery disclosed herein is preferable as a vehicle battery since a change in the actuation pressure of the current-blocking system can be suppressed to a low level even on long-term use. Thus, this description provides a vehicle battery comprising a sealed secondary battery disclosed herein. Such a vehicle battery (e.g. a battery used as a driving power supply for a vehicle including an electric automobile, hybrid automobile and the like, i.e. a vehicle drive battery) may be in a form of multi-cell battery comprising a plurality of single cells electrically connected to each other, with the single cell being a sealed secondary battery disclosed herein.

The present description also provides a vehicle, such as a plug-in hybrid automobile (PHV), hybrid automobile (HV), electric automobile (EV) and the like, comprising, as a driving power supply, a sealed secondary battery or a multi-cell battery disclosed herein.

EMBODIMENTS OF INVENTION

The concept of "secondary battery" in the present description includes storage batteries (i.e. chemical cells) such as lithium-ion secondary batteries, lithium metal secondary batteries, nickel-hydrogen batteries, nickel-cadmium batteries and the like as well as capacitors (i.e. physical cells) such as electric double-layer capacitors and the like. The term "lithium secondary battery" refers to a secondary battery that uses lithium ions as electrolyte ions (charge carrier) and effects charging and discharging by charge transfer associated with lithium ions moving between the positive and negative electrodes. Secondary batteries generally called lithium-ion secondary batteries (or lithium-ion batteries) are typical examples included in the lithium secondary battery in the present description.

Figure 14:
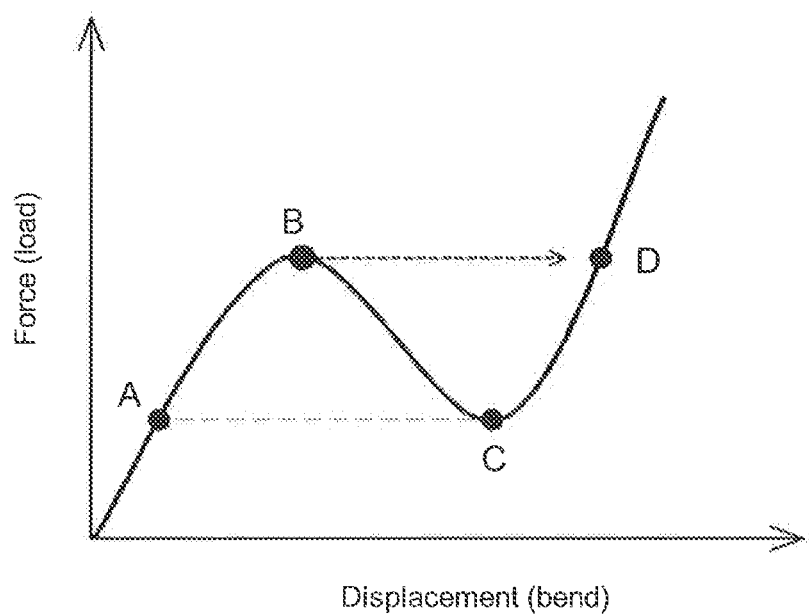
FIG. 14 shows an explanatory diagram schematically illustrating the relationship of the displacement upon snap-through deformation vs. the force (load).

In the present description, the term "snap-through deformation" refers to a mode of deformation such that the load-displacement curve has a maximum and a minimum values. FIG. 14 shows a typical example of the load-displacement curve representing snap-through deformation. In load control mode, for instance, a gas pressure is applied from the bottom of the drawing (equivalent to the inside of the battery) to pressure-sensitive deformable portion 32 of pressure-sensitive member 30 having a shape shown in FIG. 4. During a process (outward path) where the gas pressure gradually increases, when the stress exerted by the gas pressure reaches point B (maximum load value) in FIG. 14, the shape of pressure-sensitive deformable portion 32 snaps from point B through point D. On the other hand, during a process (return path) where a gas pressure is applied from the opposite side of the outward path to pressure-sensitive deformable portion 32 that has undergone snap-through deformation once and the gas pressure gradually increases, when the stress exerted by the gas pressure exceeds point D to reach point C in FIG. 14, the shape of pressure-sensitive deformable portion 32 snaps from point C through point A.

Figure 4:
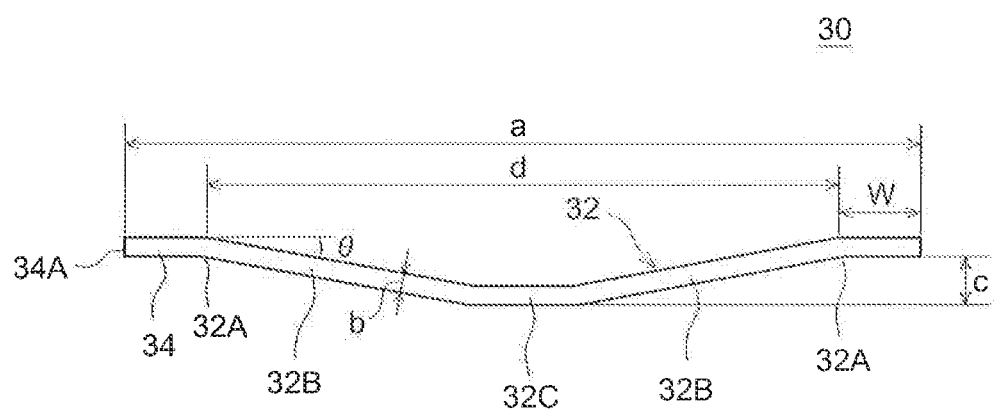
FIG. 4 shows a cross-sectional view illustrating the shape of a pressure-sensitive member in the first state included in the current-blocking system provided to the sealed secondary battery according to the first embodiment.
Figure 15:
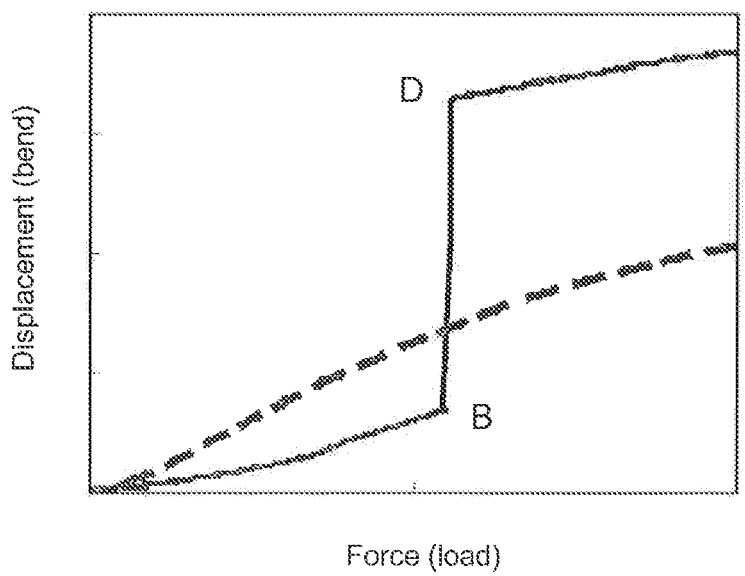
FIG. 15 shows an explanatory diagram schematically illustrating the relationship of the force (load) upon snap-through deformation vs. the displacement.

For example, when focused on the displacement (displacement from the reference position) of flat portion 32C of pressure-sensitive deformable portion 32 shown in FIG. 4, in a normal deformation mode accompanying no snap-through deformation, as shown by the dashed curve in FIG. 15, with increasing load (gas pressure), the displacement gradually increases. On the contrary, in snap-through deformation as shown in FIG. 14, as shown by the solid curve in FIG. 15, when the load increases to reach point B in FIG. 14, the position of flat portion 32C is displaced (snaps) upwards in FIG. 4. In the art disclosed herein, as exemplified in FIG. 14, the occurrence of snap-through deformation of the pressure-sensitive deformable portion can be confirmed by a maximum and a minimum values appearing in the load-displacement curve of the pressure-sensitive deformable portion. In the present description, "the first state" of the pressure-sensitive deformable portion refers to a state where the pressure-sensitive deformable portion is in the shape (position) prior to snap-through deformation. "The second state" of the pressure-sensitive deformable portion refers to a state where the pressure-sensitive deformable portion is in the shape (position) after undergoing snap-through deformation from the first state.

As an example of the sealed secondary battery disclosed herein, a preferable embodiment related to a lithium-ion secondary battery is described below while referring to drawings. The dimensional relationships (of length, width, thickness, etc.) in each drawing do not represent actual dimensional relationships. Members or sites producing the same effects may be assigned with a common reference numeral, and duplicated descriptions are sometimes omitted or simplified. Matters (e.g. manufacturing processes of positive electrode active material and negative electrode active material, the composition and manufacturing process of electrolyte, etc.) necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field.

Although not to be particularly limited, an example is given below, describing mainly a lithium-ion secondary battery in an embodiment where a wound type of electrode unit (or "wound electrode unit" hereinafter) and a non-aqueous electrolyte solution are contained in a square (i.e. cuboid box-shaped) or cylindrical case. The shape of the lithium-ion secondary battery is not limited to square and cylindrical shapes and may be any shape. The form of the electrode unit is not limited to a wound electrode unit. For instance, it can be a layered electrode unit, etc. As far as a current-blocking system configured as disclosed herein is included, the type of secondary battery is not limited to a lithium-ion secondary battery (typically a lithium-ion secondary battery comprising a non-aqueous electrolyte) and may be a nickel-hydrogen battery or any other secondary battery.

<First Embodiment>

Figure 1:
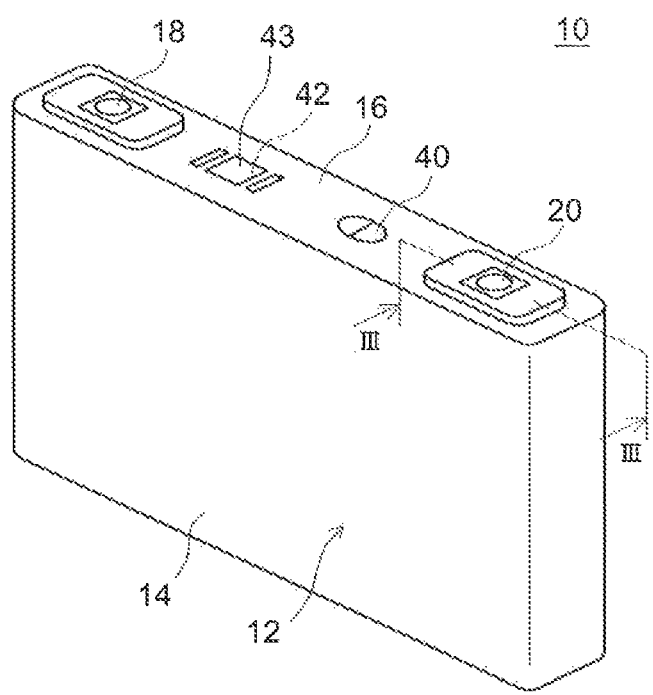
FIG. 1 shows a perspective view schematically illustrating the outer shape of a sealed secondary battery according to the first embodiment.
Figure 2:
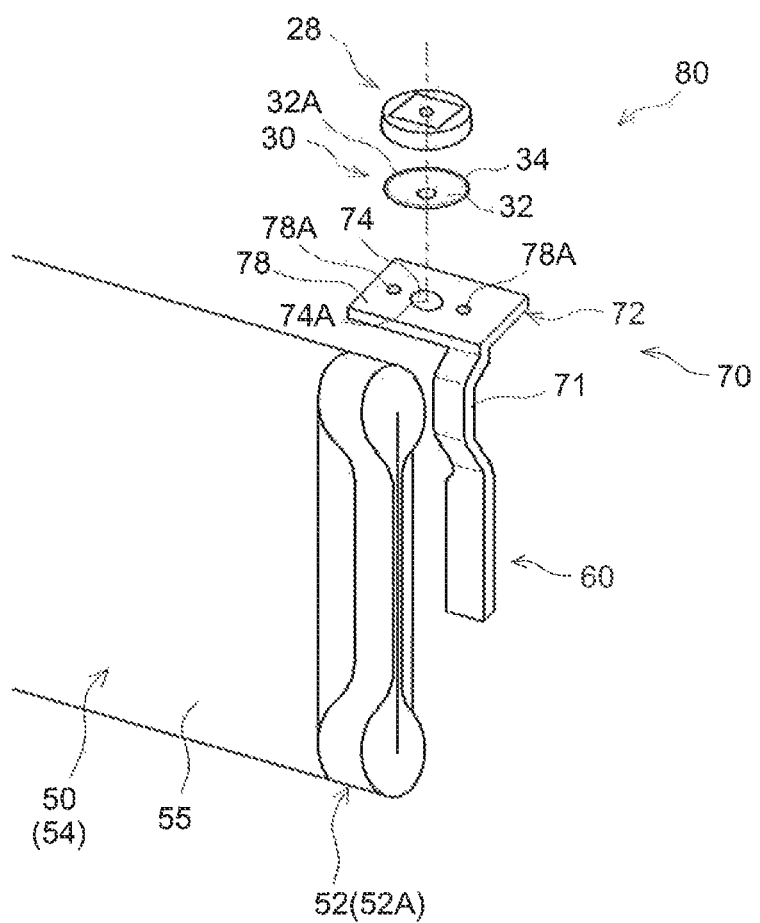
FIG. 2 shows an exploded perspective view illustrating the configuration of a current-blocking system provided to the sealed secondary battery according to the first embodiment.
Figure 3:
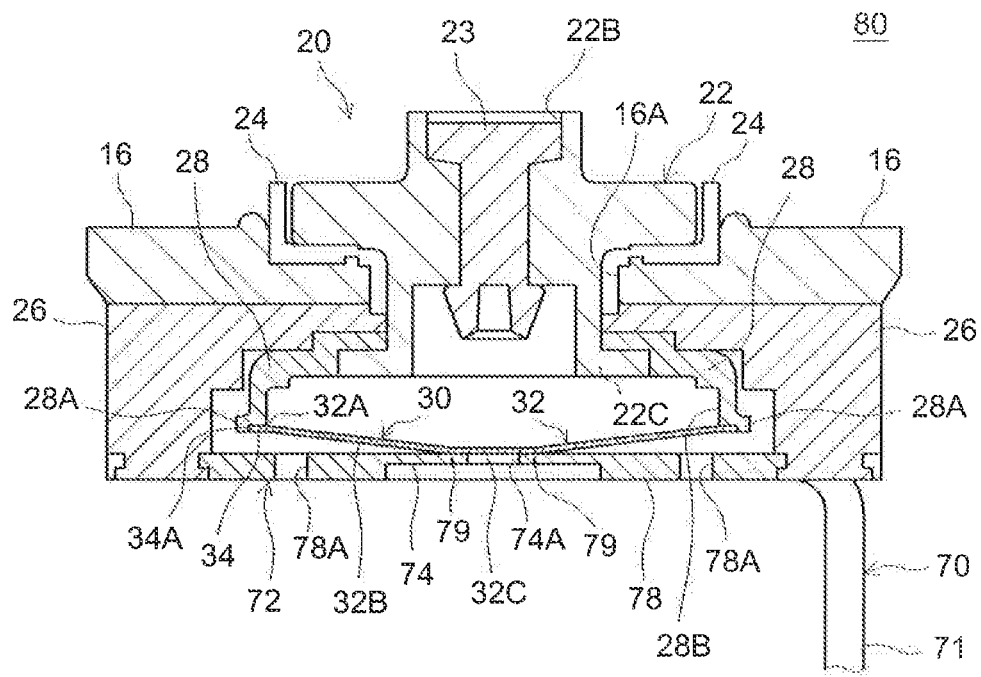
FIG. 3 shows a cross-sectional view schematically illustrating the configuration and state (before blocking of the current) of the current-blocking system provided to the sealed secondary battery according to the first embodiment.

FIG. 1 shows a simplified perspective view illustrating the outer shape of a lithium-ion secondary battery according to the first embodiment. FIG. 2 shows an exploded perspective view illustrating the configuration of its current-blocking system. FIG. 3 shows a schematic cross-sectional view showing a close-up of the current-blocking system in cross section along III-III in FIG. 1.

(Overall Constitution of Battery)

Lithium-ion secondary battery 10 according to the present embodiment is configured such that a flat wound electrode unit 50 as shown in FIG. 2 is housed in a battery case (i.e. exterior container) 12 shown in FIG. 1, along with a liquid electrolyte (electrolyte solution) not shown in the drawing.

Battery case 12 has a flat square shape corresponding to the shape of wound electrode unit 50. It is constituted with a box-shape (i.e. bottomed cuboid) main casing 14 having an opening at one end (corresponding to the top end of battery 10 in normal usage) and a sealing plate (lid) 16. Sealing plate 16 is formed with a rectangular plate member corresponding to the shape of the opening of main casing 14. Such sealing plate 16 is welded to the circumference of the opening of main casing 14 to constitute hermetic battery case 12 in a hexahedral shape comprising a pair of broad case faces opposing the broad faces of flat wound electrode unit 50 as well as four rectangular case faces (among which one rectangular face (top face) is constituted with sealing plate 16).

As for the material of case 12, the same material as those used for conventional sealed batteries can be used without particular limitations. It is preferable that case 12 is primarily constituted with a metallic material that is lightweight and highly heat-conductive. Examples of such metallic materials include aluminum, stainless steel, nickel-plated steel and the like. Case 12 (main casing 14 and sealing plate 16) according to the present embodiment is constituted with aluminum or an alloy based on aluminum.

While not particularly limited, for example, preferable external dimensions of the hexahedral battery case in this type of square battery may be such that main casing 14 and sealing plate 16 have a long side length of about 80 mm to 200 mm (e.g. 100 mm to 150 mm) and a short side length (corresponding to the width of case 12) of about 8 mm to 25 mm (e.g. 10 mm to 20 mm) while case 12 has a height of about 70 mm to 150 mm. The width of case 12 (main casing 14 and sealing plate 16) is not particularly limited. When it constitutes a sealed battery for use as a vehicle-driving power supply, the thickness is suitably about 0.3 mm to 2 mm or preferably about 0.5 mm to 1 mm.

As shown in FIG. 1, on sealing plate 16, a positive terminal 20 and a negative terminal 18 are formed for external connection. These electrode terminals 18 and 20 are exposed outside the battery case 12, being available for attachment of a terminal board or external connecting terminal having a suitable shape for the use of lithium-ion secondary battery 10 according to the present embodiment. Sealing plate 16 is provided with a safety valve 40 and an injection hole 42 between the two terminals 18 and 20. Safety valve 40 is configured such that when the internal pressure of case 12 increases to or above a prescribed level (a prescribed valve's opening pressure, e.g. about 0.3 MPa to 1.0 MPa), the valve opens and releases the internal pressure. The safety valve 40 can be a portion of sealing plate 16, formed relatively thinner than the surroundings. Injection hole 42 is constituted to allow injection (pouring) of a non-aqueous electrolyte solution into battery case 12 during construction of battery 10. FIG. 1 shows a state where injection hole 42 is sealed and masked with a sealing member 43 after the injection.

As shown in FIG. 2, similarly to the wound electrode unit of a general lithium-ion secondary battery, wound electrode unit 50 comprises a long sheet of positive electrode (positive electrode sheet) 52, a long sheet of negative electrode (negative electrode sheet) similar to the positive electrode sheet 52 which is not shown in the drawing, and a total of two long sheets of separator (separator sheets) 54. Wound electrode unit 50 is fabricated typically by layering these positive electrode sheet 52, negative electrode sheet and separator sheets 54 and wound them in the length direction followed by laterally compressing the resulting wound body to flatten it out. More specifically, the positive electrode sheet 52 and negative electrode sheet are positioned slightly off set in the width direction, whereby they are wound in such a state that edges of the width direction of the positive and negative electrode sheets extend off one and the other edges of the width direction of separator sheet 54, respectively. As a result, at one and the other end of the winding axis of wound electrode unit 50, there are formed portions corresponding to the edges of the width direction of positive electrode sheet 52 and negative electrode sheet extending outward from wound core portion 55 (i.e. a portion where the positive electrode sheet, negative electrode sheet and separator sheets are tightly wound).

FIG. 2 depicts the extending portion (positive electrode margin) 52A of positive electrode sheet 52. Such positive electrode margin 52A is electrically connected, via positive current collector tab 60 and positive current collector 70 placed inside case 12, to the positive terminal 20 for external connection. On the negative electrode side not shown in the drawing, in the same manner, the negative electrode margin is electrically connected, via a negative current collector tab and a negative current collector not shown in the drawing while placed inside case 12, to the negative terminal 18 for external connection.

In lithium-ion secondary battery 10 according to the present embodiment, current-blocking system 80 is constituted with a portion of positive terminal 20 and a portion of positive current collector 70. Such current-blocking system 80 is described later.

The materials and members constituting wound electrode unit 50 themselves can be the same as the wound electrode unit included in a conventional lithium-ion secondary battery without particular limitations. For instance, positive electrode sheet 52 may have a constitution comprising a long positive current collector sheet (e.g. aluminum foil) and a positive electrode active material layer formed on the positive current collector sheet. As the positive electrode active material used to form the positive electrode active material layer, one, two or more species of substance used in conventional lithium-ion secondary batteries can be used without particular limitations. Preferable examples include oxides (lithium transition metal oxides) comprising lithium and a transition metal as constituent metals, such as lithium nickel oxide (e.g. $LiNiO_2$), lithium cobalt oxide (e.g. $LiCoO_2$), lithium manganese oxide (e.g. $LiMn_2O_4$), etc.; phosphates comprising lithium and a transition metal as constituent metals, such as lithium manganese phosphate ($LiMnPO_4$), lithium iron phosphate ($LiFePO_4$), etc.; and the like.

The negative electrode sheet may have a constitution comprising a long negative current collector sheet (e.g. copper foil) and a negative electrode active material layer formed on the negative current collector sheet. As the negative electrode active material used to form the negative electrode active material layer, one, two or more species of substance used in conventional lithium-ion secondary batteries can be used without particular limitations. Preferable examples include carbon-based materials such as graphite carbon, amorphous carbon, etc., lithium transition metal oxides and lithium transition metal nitrides, and so on. Preferable examples of the separator sheet include a material constituted with a porous polyolefin-based resin.

As the liquid electrolyte (electrolyte solution), the same kinds as the non-aqueous electrolyte solutions conventionally used in lithium-ion secondary batteries can be used without particular limitations. Such a non-aqueous electrolyte solution typically has a composition comprising a suitable non-aqueous solvent and a supporting salt dissolved in the non-aqueous solvent. For example, as the non-aqueous solvent, can be used one, two or more species selected from a group consisting of ethylene carbonate (EC), propylene carbonate, dimethyl carbonate, diethyl carbonate (DEC), ethyl methyl carbonate, 1,2-dimethoxyethane, 1,2-diethoxyethane, tetrahydrofuran, 1,3-dioxolane and the like. As the supporting salt, for example, can be used lithium salts such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$ and the like. One example is a non-aqueous electrolyte solution containing about 1 mol/L of $LiPF_6$ in a mixed solvent of EC and DEC (e.g. a mixed solvent at an EC:DEC volume ratio of 1:1). In place of the electrolyte solution, an electrolyte in a solid form or gel form can be used.

The non-aqueous electrolyte solution may comprise a gas-generating agent as well. The gas-generating agent herein refers to a compound soluble or dispersible to a non-aqueous electrolyte solution, such that when the battery reaches an overcharged state, it undergoes a reaction to generate gas before decomposition of the non-aqueous solvent contained in the non-aqueous electrolyte solution. Preferable examples of gas-generating agents include branched-chain alkylbenzenes, cycloalkylbenzenes, biphenyls, terphenyls, diphenyl ethers and dibenzofurans. In particular, cycloalkylbenzenes such as cyclohexylbenzene (CHB), etc., and biphenyls such as biphenyl (BP), etc., are preferable while combined use of CHB and BP is particularly preferable. The amount of gas-generating agent used (added) is preferably about 0.1% by mass to 10% by mass (e.g. 0.5% by mass to 7% by mass, typically 1% by mass to 5% by mass) in the non-aqueous electrolyte solution.

(Current-Blocking System)

As depicted well in FIG. 2 and FIG. 3, inside the battery case 12, there is provided a current-blocking system 80 that is actuated by an increase in the internal pressure of the case. The art disclosed herein can be practiced preferably in an embodiment where current-blocking system 80 is provided to the conduction path electrically connecting an electrode and the corresponding electrode terminal (the conduction path may be configured to include the electrode and the electrode terminal). The conduction path is typically constituted to include at least a first conductive member and a second conductive member. In the present embodiment, the conduction path electrically connecting positive electrode sheet 52 and positive terminal 20 is equipped with current-blocking system 80 comprising a pressure-sensitive member 30 as the first conductive member and a positive current collector 70 as the second conductive member.

Current-blocking system 80 is described in detail below with reference to drawings.

As shown in FIG. 2, positive current collector tab 60 made of aluminum or an alloy based on aluminum is connected to the positive electrode margin 52A. Positive current collector 70 as the second conductive member in the present embodiment is formed, extending upwards (in the direction toward the sealing plate) from such current collector tab 60. The positive current collector 70 is made of aluminum or an alloy based on aluminum, comprising a current collector plate 72, that is, a main current collector body in a rectangular plate form (typically in a right-angled tetragonal plate form) placed adjacent to the inner face of sealing plate 16 and positioned approximately in parallel with the inner face, and a connecting arm 71 connecting the current collector plate 72 and positive current collector tab 60.

Current collector plate 72 comprises a thin portion 74 and a relatively thick surrounding portion 78. As described later, to the thin portion 74, pressure-sensitive member 30 is welded as the first conductive member in the present embodiment. The two-dimensional shape of the thin portion 74 can be circular, rectangular, etc. Usually, a circular thin portion 74 can be preferably used. As shown in FIG. 2, at the center of the thin portion 74 and multiple regions (two regions in the present embodiment) in the thick portion 78, gas vents 74A and 78A are formed to pass through current collector plate 72. The thin portion 74 has a groove (notch) 79 formed on the side of the case's inner face so as to annularly surround the circumference of gas vent 74A.

As shown in FIG. 3, the positive terminal 20 according to the present embodiment comprises, on the side of the outer face of sealing plate 16, a cylindrical connecting terminal 22 attached to a positive electrode socket 16A in sealing plate 16, and a gasket 24 placed between the connecting terminal 22 and sealing plate 16 (around socket 16A). A rubber-made terminal stopper 23 is inserted in a through-hole 22B in connecting terminal 22.

The positive terminal 20 according to the present embodiment comprises, on the side of the inner face of sealing plate 16, an insulating member 26 made of a synthetic resin in a rectangular cap form, and a pressure-sensitive member holder 28 made of a metal (e.g. of aluminum) in a circular cap form. In the insulating member 26 and pressure-sensitive member holder 28, there are formed insertion holes, respectively, through which the connecting terminal 22 is inserted. As shown in FIG. 3, connecting terminal 22 is inserted in the holes formed in gasket 24, sealing plate 16, insulating member 26 and pressure-sensitive member holder 28, respectively; and its end portion 22C is crimped as shown in the drawing. By this means, these members 22, 24, 16, 26 and 28 are fastened together into an assembly.

As shown in FIG. 3 and FIG. 4, pressure-sensitive member 30 in the present embodiment is formed of a conductive material (preferably a highly conductive metallic material, e.g. aluminum) and comprises a pressure-sensitive deformable portion 32 and a flange 34 projecting outwards from the periphery thereof. In the state shown in FIG. 3 (before actuation of current-blocking system 80, i.e. the first state), pressure-sensitive deformable portion 32 is formed as a concavity curving inwards from flange 34 toward the inside of battery case 12. More specifically, as depicted well in FIG. 4, the concavity comprises a tapered portion 32B narrowing from the periphery of pressure-sensitive deformable portion 32 toward the center thereof and a flat portion 32C positioned at the center of pressure-sensitive deformable portion 32 which is on the inner diameter side of tapered portion 32B. When the internal pressure of battery case 12 increases to or above a prescribed pressure value, the pressure-sensitive deformable portion 32 can deform toward the outside of battery case 12 to switch over to the second state. The current-blocking system according to the art disclosed herein is characterized by being configured such that snap-through deformation takes place during transformation of the pressure-sensitive deformable portion 32 from the first state to the second state, whereby the snap-through transformation cuts off the conduction between positive electrode sheet 52 and positive terminal 20 (i.e. the conduction path electrically connecting these members is cut off).

Pressure-sensitive deformable portion 32 of pressure-sensitive member 30 is joined to the thin portion 74 of current collector plate 72. More specifically, as shown in FIG. 3, to the inner side (inner diameter side) relative to the position of annular groove (notch) 79 in the thin portion 74, flat portion 32C of pressure-sensitive deformable portion 32 is joined. The method for joining pressure-sensitive deformable portion 32 and current collector plate 72 is not particularly limited. For instance, means such as welding (ultrasonic welding, laser welding, etc.), bonding with a conductive adhesive and like means can be employed. In the present embodiment, pressure-sensitive member 30 made of aluminum is fixed by ultrasonic welding to current collector plate 72 made of aluminum. In other words, in the thin portion 74 of current collector plate 72, the annular groove 79 is present around the location to which the flat portion 32C of pressure-sensitive deformable portion 32 is joined. The groove 79 can prescribe the location at which the thin portion 74 breaks off upon snap-through deformation of pressure-sensitive deformable portion 32.

On the other hand, flange 34 of pressure-sensitive member 30 is fastened by welding (ultrasonic welding, laser welding, etc.) to an end portion 28A of pressure-sensitive member holder 28. In other words, of the pressure-sensitive member 30, the pressure-sensitive deformable portion 32 (flat portion 32C) and flange 34 are joined to positive current collector 70 (current collector plate 72) and pressure-sensitive member holder 28, respectively. By this means, in the state shown in FIG. 3, a conduction path is formed from positive electrode sheet 52 through positive electrode margin 52A, current collector tab 60, current collector (first conductive member) 70, pressure-sensitive member 30 and pressure-sensitive member holder 28 to connecting terminal 22. Via such conduction path, charging and discharging of lithium-ion secondary battery 10 are mediated. In pressure-sensitive member holder 28, on the inner side of the end portion 28A, a recess 28B is formed to allow deformation of pressure-sensitive member 30 to the second state. The inner space of the recess 28B is divided hermetically from the space inside battery case 12.

Figure 5:
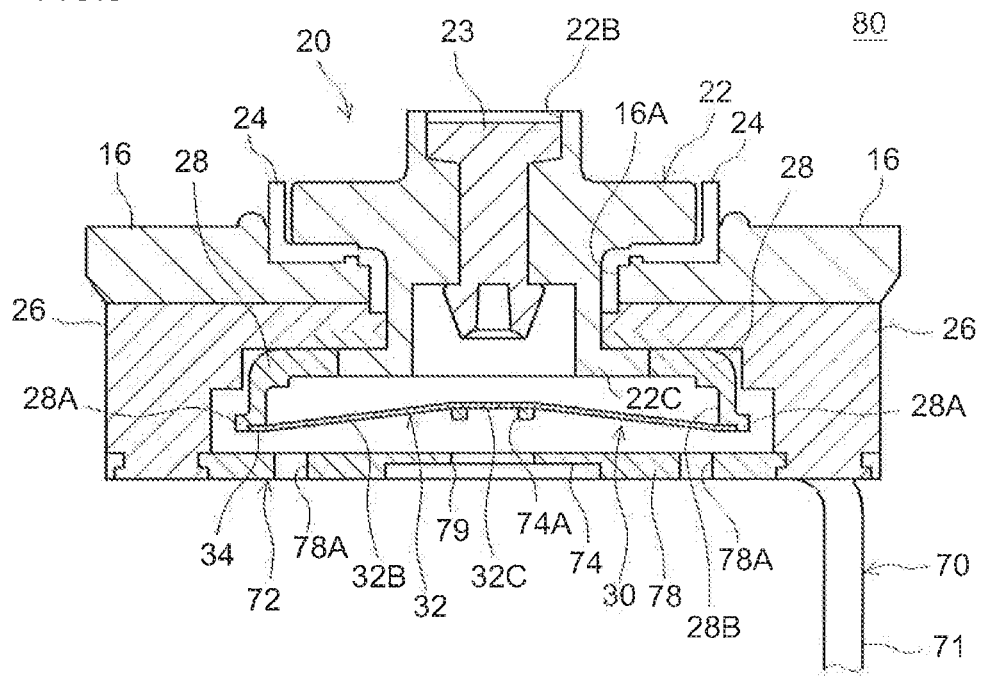
FIG. 5 shows a cross-sectional view schematically illustrating the configuration and state (after blocking of the current) of the current-blocking system provided to the sealed secondary battery according to the first embodiment.

Actuation of current-blocking system 80 having such a constitution is described. In particular, for instance, when lithium-ion secondary battery 10 falls into an overcharged state by improper operation and some gas is generated inside battery case 12 to increase the internal pressure of the case, the increase in the internal pressure of the case exerts stress on the surface of pressure-sensitive deformable portion 32 (in the first state) shown in FIG. 3, with the surface corresponding to the inner side of battery case 12. When the stress reaches point B in the schematic diagram shown in FIG. 14, pressure-sensitive deformable portion 32 undergoes snap-through deformation to transform its shape into the second state shown in FIG. 5. During the snap-through deformation, flat portion 32C is displaced greatly and suddenly toward the outside of case 12 (see FIG. 15) to instantly increase the stress exerted on groove 79, whereby the thin portion 74 quickly breaks off at the groove 79. As a result, the portion inside groove 79 in the thin portion 74 along with the flat portion 32C of pressure-sensitive deformable portion 32 joined thereto is displaced toward the outside of case 12 and separated from the portion outside groove 79. This disconnects conduction between pressure-sensitive member 30 and current collector 70 and cuts off the conduction path from connecting terminal 22 through positive electrode sheet 52 to block the overcharging current.

On the contrary, when a small amount of gas is generated in normal charging and discharging modes of lithium-ion secondary battery 10, even if the magnitude of the pressure rise inside the case caused by the generated gas is within a normal range, pressure-sensitive deformable portion 32 is subjected to weak stress by the internal pressure rise and tries to undergo bending and deformation toward the outside of battery case 12. Until the stress reaches point B in the schematic diagram shown in FIG. 14, however, as shown in FIG. 15, the displacement (e.g. displacement of flat portion 32C toward the outside of the case) is small and the thin portion 74 does not thus break off, whereby conduction between positive electrode sheet 52 and connecting terminal 22 is maintained. As described above, since the current-blocking system 80 in the present embodiment is configured such that by snap-through deformation of pressure-sensitive deformable portion 32, the thin portion 74 breaks off to block the current. Accordingly, the current-blocking system 80 can prevent the battery more assuredly from malfunctioning during normal use. Since the pressure-sensitive deformable portion 32 that has undergone snap-through deformation to the second state once becomes stable in the shape (position) of the second state, it is possible to stably maintain a state where the pressure-sensitive member 30 side and the current collector 70 side of the conduction path are separated at a desirable distance. Also, when a vibration or impact, etc., has been applied after actuation of current-blocking system 80, it allows for more assured avoidance of unwilling recurrence of conduction between pressure-sensitive member 30 and current collector 70.

In the art disclosed herein, a pressure rise inside the case actuates current-blocking system 80. More specifically, pressure-sensitive deformable portion 32 included in current-blocking system 80 is subjected to the internal pressure of the case to undergo snap-through deformation from the first state (FIG. 3) to the second state (FIG. 5), whereby the conduction path electrically connecting positive electrode sheet 52 and connecting terminal 22 breaks off to block the current. Herein, the internal pressure of the case (the actuation pressure of the current-blocking system) that brings about the actuation of current-blocking system 80 depends mainly on the tendency of pressure-sensitive deformable portion 32 to undergo snap-through deformation (i.e. the internal pressure of the case enough to exert the stress corresponding to point B in FIG. 14 on the pressure-sensitive deformable portion). The tendency of pressure-sensitive deformable portion 32 to undergo snap-through deformation can be easily adjusted to a desirable actuation pressure, for instance, by modifying the shape of pressure-sensitive member 30 (e.g. the plate thickness b shown in FIG. 4) (see FIG. 12). On the other hand, in the current-blocking system 80 according to the present embodiment, the tendency of the conduction path to break off (the stress required to cause the conduction path to break off) influences the actuation pressure to a relatively small extent. In other words, in the present embodiment, the main function of annular groove (notch) 79 provided to the thin portion 74 is to intentionally provide a weak spot to a region of the thin portion 74 to prescribe the location at which the thin portion 74 breaks off upon actuation of current-blocking system 80, but not to prescribe the actuation pressure of current-blocking system 80. The tendency of the thin portion 74 to break off may be at a level such that pressure-sensitive deformable portion 32 joined to the thin portion 74 is not prevented from undergoing snap-through deformation when exposed to some internal pressure of the case. Thus, unlike a current-blocking system whose actuation pressure depends mainly on the tendency of the thin portion 74 to break off, variances of the actuation pressure of current-blocking system 80 can be effectively suppressed without strict management of the shape of groove 79 (e.g. groove depth) during manufacturing (see FIG. 11). This is advantageous in view of the productivity of lithium-ion secondary battery 10, etc.

According to such an embodiment where snap-through deformation of pressure-sensitive deformable portion 32 is utilized to break off a thin portion 74, as described above, the actuation pressure of current-blocking system 80 can be controlled by the tendency of pressure-sensitive deformable portion 32 to undergo snap-through deformation (i.e. the influence of the shape of groove 79 on the actuation pressure is small). Thus, in normal charging and discharging modes of the battery, even when the state where the internal pressure of the case has somewhat increased within a normal range continues, fatigue, creep and the like of current collector plate 72 possibly induced by such internal pressure of the case will influence the actuation pressure only to a small extent. Accordingly, a lithium-ion secondary battery and other sealed secondary battery can be obtained such that the current-blocking system yields little change in the actuation pressure even on long-term use.

Specific configuration of the current-blocking system and details of its place of installation, etc., are not particularly limited. For instance, some components of the current-blocking system can be modified, or the system can be installed away from the sealing plate. The current-blocking system can be provided to either the positive electrode side or negative electrode side, or to the both sides. As for the current collectors, in general, the positive current collector is formed of aluminum or an aluminum alloy while the negative current collector is formed of copper or a copper alloy. When these are compared, since aluminum or an aluminum alloy is advantageous in terms of the workability of the current collector, etc., it is usually preferable to employ an embodiment where the current-blocking system is provided at the positive electrode side. When the current-blocking system is provided to the negative electrode side, the configuration and method are basically the same as the positive electrode, and thus further description is omitted herein.

(First Example of Modification)

Figure 16:
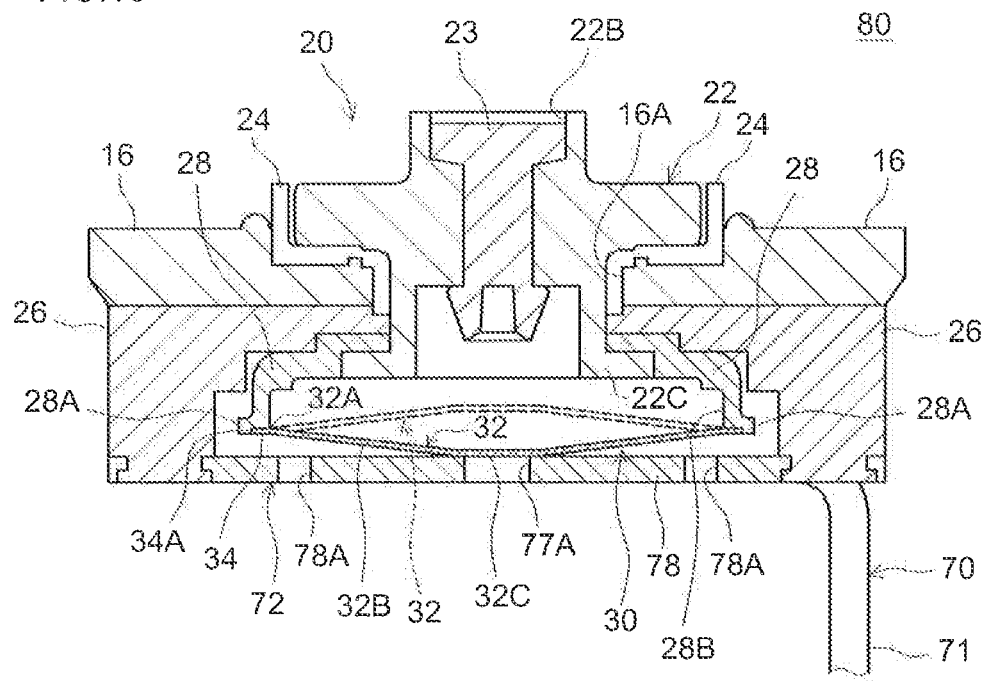
FIG. 16 shows a cross-sectional view schematically illustrating the configuration and state (before blocking of the current) of a current-blocking system provided to a sealed secondary battery according to a first modification example of the first embodiment.

With reference to FIG. 16, here is described a modification example of lithium-ion secondary battery 10 according to the first embodiment (a lithium-ion secondary battery configured such that an annular groove 79 is provided to a thin portion 74 wherein a pressure-sensitive deformable portion 32 is securely joined to the thin portion of current collector at the inner side of the groove 79, and by snap-through deformation of the pressure-sensitive deformable portion, the thin portion 74 is caused to break off at the groove 79 while retaining the joint). In the example shown in FIG. 16, the thin portion 74 and groove 79 in current collector plate 72 in the first embodiment shown in FIG. 3 are omitted, and a current collector plate 72 having a uniform thickness is illustrated as shown in FIG. 16. By joining (e.g. welding) a pressure-sensitive deformable portion 32 to the central portion of the current collector plate 72, pressure-sensitive member (first conductive member) 30 and current collector (second conductive member) 70 are directly connected. It is also configured such that when pressure-sensitive deformable portion 32 undergoes snap-through deformation caused by a pressure rise inside the case, the joint is released (e.g. with the weld separating), whereby pressure-sensitive member 30 and current collector 70 separate to disconnect the conduction path between the two members.

In this example of modification, the actuation pressure of current-blocking system 80 is also dependent primarily on the tendency of pressure-sensitive deformable portion 32 to undergo snap-through deformation while the bonding strength between pressure-sensitive deformable portion 32 and current collector plate 72 contributes little. Thus, the bonding strength between pressure-sensitive deformable portion 32 and current collector plate 72 should only be at a level that does not interfere with snap-through deformation of pressure-sensitive deformable portion 32. Accordingly, without strictly managing the bonding strength during manufacturing, variances of the actuation pressure of current-blocking system 80 can be effectively suppressed. Since it requires no thinner portion or groove in current collector plate 72, a wider conduction path can be obtained in the current collector plate 72. In a battery of which high-rate charge and discharge performance is required such as a sealed secondary battery (e.g. lithium-ion secondary battery) used as a vehicle-driving power supply, it is especially meaningful to obtain a wide conduction path as described above.

In FIG. 16, the solid lines indicate the shape of pressure-sensitive deformable portion 32 before actuation of current-blocking system 80 (the shape in the first state) while the dashed lines outline the shape of pressure-sensitive deformable portion 32 after the actuation of current-blocking system 80 (i.e. after snap-through deformation) (the shape in the second state). Pressure-sensitive deformable portion 32 and current collector plate 72 can be joined together, for instance, by welding the flat portion 32C of pressure-sensitive deformable portion 32 to the periphery of gas vent 77A provided at the center of current collector plate 72.

(Second Example of Modification)

Figure 17:
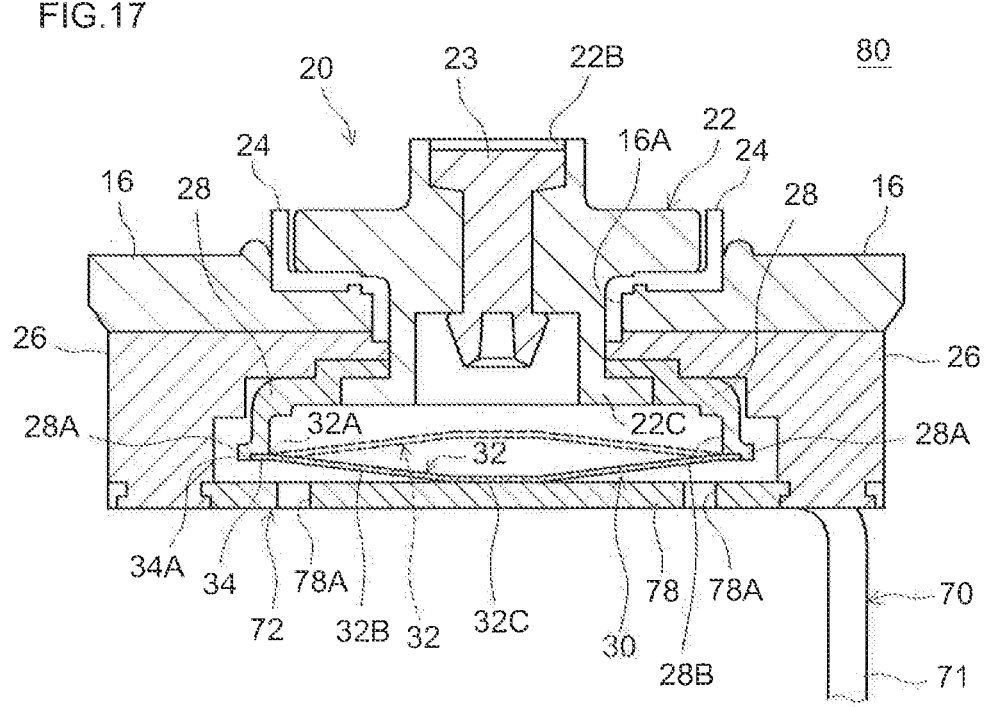
FIG. 17 shows a cross-sectional view schematically illustrating the configuration and state (before blocking of the current) of a current-blocking system provided to a sealed secondary battery according to a second modification example of the first embodiment.

As another example of modification of lithium-ion secondary battery 10 according to the first embodiment, instead of joining pressure-sensitive member 30 and current collector 70 together, it can be configured as shown in FIG. 17, such that pressure-sensitive deformable portion 32 of pressure-sensitive member (first conductive member) 30 directly contacts current collector (second conductive member) 70 (preferably, pressure-sensitive member 30 is elastically pushed against current collector 70) so as to attain conduction upon direct connection between pressure-sensitive member 30 and current collector 70 while pressure-sensitive deformable portion 32 is in the first state. In the example shown in FIG. 17, with the flat portion 32C of pressure-sensitive deformable portion 32 being elastically pushed against the top face of the central portion of current collector plate 72 in the first modification example, conduction between the two members is maintained. In the example shown in FIG. 17, is used a current collector plate having the shape of the first modification example with gas vent 77A being omitted from current collector plate 72 (a shape free of a through-hole in the area against which the flat portion 32C of current collector plate 72 is pushed). The pressure inside the case acts via gas vent 78A onto the inner face (the bottom face in FIG. 17) of pressure-sensitive deformable portion 32. When the pressure inside the case increases, pressure-sensitive deformable portion 32 undergoes snap-through deformation from the first state to the second state (into the shape shown by dashed lines in the drawing), whereby the pressure-sensitive deformable portion 32 separates away from current collector 72 to cut off the contact between the two to disconnect the conduction path between pressure-sensitive member 30 and current collector 70.

The art disclosed herein can also be practiced in an embodiment using a non-conductive pressure-sensitive member. Such an embodiment can be achieved, for instance, with the use of a current-blocking system comprising a first conductive member and a second conductive member positioned separately while in free states (with no external force being applied), and further comprising a pressure-sensitive member made of a non-conductive material (pressure-sensitive member made of a resin or rubber, etc.). The current-blocking system can be configured such that it is installed in the conduction path electrically connecting the positive electrode sheet and connecting terminal; when pressure-sensitive deformable portion of the pressure-sensitive member is in the first state, the pressure-sensitive deformable portion moves (pushes) the first conductive member toward the second conductive member side to achieve direct contact and conduction between the two members; and when a pressure rise inside the case causes the pressure-sensitive deformable portion to undergo snap-through deformation away from the second conductive member, the direct contact between the first conductive member and second conductive member is cut off to disconnect the conduction path.

<Second Embodiment>

Figure 6:
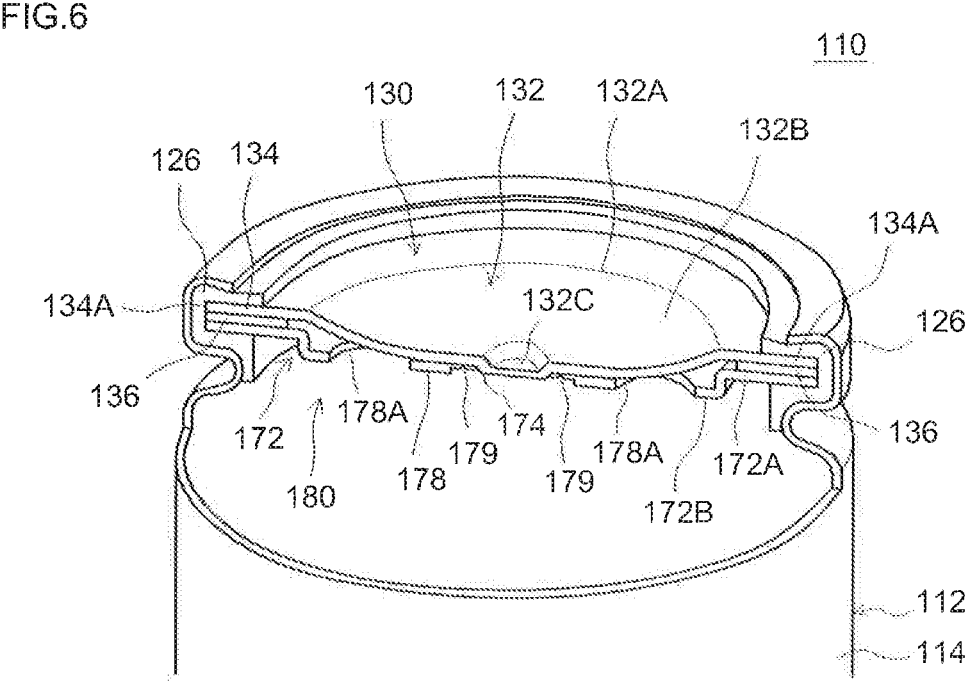
FIG. 6 shows a partially cutaway perspective view illustrating the configuration and state (before blocking of the current) of a current-blocking system provided to a sealed secondary battery according to the second embodiment.

With respect to an example in which the current-blocking system disclosed herein is applied to a cylindrical lithium-ion secondary battery, while referring to FIG. 6 to FIG. 10, the constitution of the main part is described. FIG. 6 shows a partially cutaway perspective view illustrating lithium-ion secondary battery 110 according to this embodiment. To facilitate visualization, members (connecting terminal, etc.) positioned outside and members (electrodes, etc.) positioned inside the current-blocking system 180 in battery 110 are omitted from the drawings.

Lithium-ion secondary battery 110 according to this embodiment comprises a cylindrical battery case 112 as shown in FIG. 6 as well as a wound cylindrical electrode unit and a non-aqueous electrolyte solution (neither shown in the drawing) housed therein. Battery case 112 comprises a cylindrical main casing 114 having an opening at one end, and a lid (not shown) fixed on the opening to seal the opening. The lid is constituted with a conductive material (e.g. aluminum), serving also as the positive terminal of the secondary battery 110. The wound electrode unit is fabricated in the same manner as electrode unit 50 shown in FIG. 2 except that it has a cylindrical shape, such that it comprises a positive electrode sheet, a negative electrode sheet and two separator sheets and is fabricated by layering these sheets and winding the layers in the length direction. Current-blocking system 180 is installed in the conduction path electrically connecting the positive electrode sheet and the lid (positive terminal).

Figure 7:
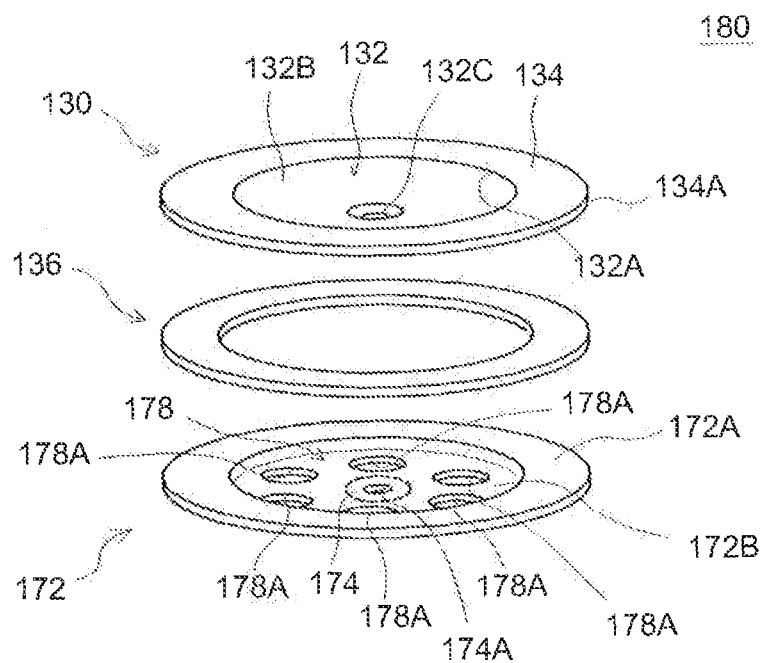
FIG. 7 shows an exploded perspective view illustrating the configuration of a current-blocking system provided to a sealed secondary battery according to the second embodiment.
Figure 8:
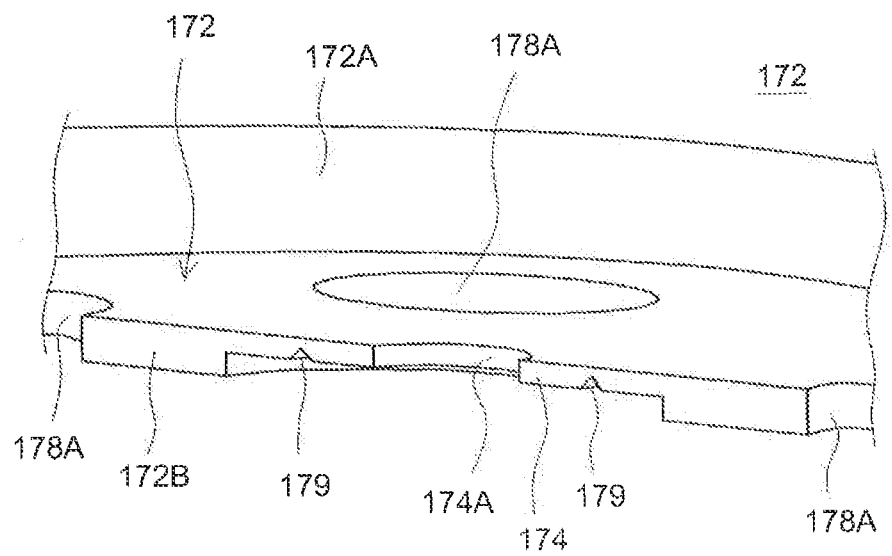
FIG. 8 shows a perspective, cross-sectional view showing a close-up of the main part of a current collector included in the sealed secondary battery according to the second embodiment.

As depicted well in FIG. 7, the current-blocking system 180 comprises a pressure-sensitive member 130 as the first conductive member, a conductive plate 172 as the second conductive member, and an insulating spacer 136 placed between the two. Pressure-sensitive member 130 and conductive plate 172 are circular in top-down planer view, with each having an outer diameter approximately equal to the inner diameter of battery case 112. Spacer 136 is formed in a flat ring shape and placed between the outer border (flange 134) of pressure-sensitive member 130 and the outer border of conductive plate 172 to interfere with conduction between the outer borders of the two members. The outer diameter of the spacer 136 approximately equals to the outer diameters of pressure-sensitive member 130 and conductive plate 172.

As shown in FIG. 6, conductive plate 172, spacer 136 and pressure-sensitive member 130 constituting current-blocking system 180 are layered in this order from the battery's inside up, with their outer borders being crimped with battery case 112. Between the outer borders and battery case 112 (e.g. made of aluminum), an insulating member 126 is present, thereby insulating conductive plate 172 and pressure-sensitive member 130 from battery case 112 at the outer borders.

Conductive plate 172 is a plate-like member formed from a conductive material (preferably a highly conductive metallic material, e.g. aluminum), comprising a circular thin portion 174 provided at the center of the diameter as well as a surrounding thick portion 178 that is relatively thicker than thin portion 174. In cross section of conductive plate 172, the thick portion 178 includes a step between the outer border 172A of conductive plate 172 and the central portion 172B positioned in the inner region of the diameter. As depicted well in FIG. 7, at the center of the thin portion 174 and multiple locations in the thick portion 178 (at six locations in this embodiment), gas vents 174A and 178A are formed to pass through conductive plate 172. As depicted well in FIG. 8, in the thin portion 174, the surface on the case's inner face side includes a groove (notch) 179 formed to annually surround the gas vent 174A.

Pressure-sensitive member 130 is formed of a conductive material (preferably a highly conductive metallic material, e.g. aluminum) and comprises a pressure-sensitive deformable member 132 and a flange 134 projecting outwards from the periphery. In the state shown in FIG. 6 (before actuation of current-blocking system 80, i.e. the first state), pressure-sensitive deformable portion 132 is formed as a concavity in a dome shape (arched roof shape) curving inwards from flange 134 toward the inside of battery case 112. More specifically, as depicted well in FIG. 9, the concavity comprises a curved portion 132B formed in continuation from the inner side of flange 134, and a depression 132C positioned at the inner diameter side in the curved portion 132B, that is, at the center of pressure-sensitive deformable portion 132. In a preferable embodiment, the curved portion 132B is formed in a shape of a section cut out of a spherical shell (in R-shape). When the internal pressure of battery case 112 increases to or above a prescribed pressure value, the pressure-sensitive deformable portion 132 can deform toward the outside of battery case 112 to switch over to the second state. The current-blocking system 180 according to this embodiment, the pressure-sensitive deformable portion 132 is configured such that the pressure-sensitive deformable portion 132 undergoes snap-through deformation from the first state to the second state so as to disconnect the conduction path electrically connecting the positive electrode sheet and positive terminal.

Pressure-sensitive deformable portion 132 of pressure-sensitive member 130 is joined to the thin portion 174 of current collector plate 172. More specifically, as shown in FIG. 6, at the inner side (inner diameter side) relative to the position of annular groove (notch) 179 in the thin portion 174, depression 132C of pressure-sensitive deformable portion 132 is joined (preferably welded). For example, as shown in FIG. 6, the outer surface of depression 132C can be fit in the inner circumference of gas vent 174A, and the seam can be welded.

Actuation of current-blocking system 80 having such a constitution is described below. In particular, for instance, when lithium-ion secondary battery 110 falls into an overcharged state by improper operation and some gas is generated inside battery case 112 to increase the internal pressure of the case, the increase in the internal pressure of the case exerts stress on the surface of pressure-sensitive deformable portion 132 (in the first state) shown in FIG. 6, with the surface corresponding to the inner side of battery case 112. When the stress reaches point B in the schematic diagram shown in FIG. 14, pressure-sensitive deformable portion 132 undergoes snap-through deformation to transform its shape into the second state shown in FIG. 10. During the snap-through deformation, depression 132C is displaced greatly and suddenly toward the outside of case 112 (see FIG. 15) to instantly increase the stress exerted on groove 179, whereby the thin portion 174 quickly breaks off at the groove 179. As a result, the portion inside groove 179 in the thin portion 174 along with the depression 132C of pressure-sensitive deformable portion 132 joined thereto is displaced toward the outside of case 112 and separated from the portion outside groove 179. This disconnects conduction between pressure-sensitive member 130 and current collector plate 172 and cuts off the conduction path from connecting terminal (not shown) through positive electrode sheet 152 to block the overcharging current.

<Shape of Pressure-Sensitive Member>

A preferable shape of the pressure-sensitive member in the art disclosed herein is described below.

The pressure-sensitive member is a plate-like body formed with a prescribed material (which can be a conductive material such as metal, etc., or a non-conductive material such as resin, rubber, etc.). The thickness b of the pressure-sensitive member in the pressure-sensitive deformable portion (i.e. the plate thickness of the pressure-sensitive deformable portion; see FIG. 4 and FIG. 9) can be selected in accordance with the pressure-receiving surface area (surface area exposed to the pressure inside the case), shape, material and the like of the pressure-sensitive deformable portion, so that at a desired actuation pressure, the pressure-sensitive deformable portion can suitably undergo snap-through deformation.

Usually, it is suitable that the pressure-sensitive deformable portion has a thickness b of 0.10 mm or larger. A pressure-sensitive member having a pressure-sensitive deformable portion with such a thickness b is suitable for bringing about proper snap-through deformation by a pressure rise inside the battery case. For example, pressure-sensitive members can be obtained, having pressure-sensitive deformable portions with smaller deviations of the load-displacement curves. From such standpoint, the pressure-sensitive member has a thickness b preferably larger than 0.15 mm, or more preferably equal to or larger than 0.17 mm. The upper limit of the thickness b is not particularly limited. Usually, it is suitably 1 mm or smaller, preferably 0.7 mm or smaller (e.g. 0.5 mm or smaller).

In a pressure-sensitive member comprising a pressure-sensitive deformable portion and a flange projecting outwards from the periphery of the pressure-sensitive deformable portion, the thickness of the flange may be approximately equal to the thickness b of the pressure-sensitive deformable portion, or larger or smaller than the thickness b. For instance, a pressure-sensitive member having a shape such that the flange thickness and the pressure-sensitive deformable portion's thickness b are approximately equal (typically equal) can be preferably used.

In a pressure-sensitive member comprising a pressure-sensitive deformable portion and a flange projecting outwards from the periphery of the pressure-sensitive deformable portion, the flange's outer rim and pressure-sensitive deformable portion's periphery (typically matching the flange's inner rim) are both preferably circular. A pressure-sensitive member having a shape such that the flange's outer rim and pressure-sensitive deformable portion's periphery are concentrically positioned can be preferably used. A pressure-sensitive deformable portion having such a shape is suitable for bringing about proper snap-through deformation by a pressure rise inside the battery case.

The outer diameter a (see FIG. 4 and FIG. 9) of the flange can be suitably selected in view of the battery case dimensions or open space inside the case, etc. It is preferable that the flange has the largest possible outer diameter a within a range that does not interfere with other components. This is because, in general, with increasing outer diameter of the pressure-sensitive deformable portion, the pressure-receiving surface area of the pressure-sensitive deformable portion increases, whereby the pressure-sensitive deformable portion that can undergo snap-through deformation at a prescribed actuation pressure can have a larger thickness b to obtain a wider conduction path in the pressure-sensitive deformable portion. In a battery of which high-rate charge and discharge performance is required such as a sealed secondary battery (e.g. lithium-ion secondary battery) used as a vehicle-driving power supply, it is especially meaningful to obtain a wide conduction path as described above.

From such standpoint, for instance, when applying the art to a cylindrical battery, an embodiment as shown in FIG. 6 where an outer rim 134A of flange 134 occupies almost the entire inner diameter of battery case 112 can be preferably employed. By this means, the pressure-sensitive deformable portion 132 can have the largest possible outer diameter d on the inner diameter side of outer rim 134A of flange 134. In a sealed square secondary battery as shown in FIG. 1, it is preferable as shown in FIG. 2 that the flange 34 has the largest possible outer diameter a within a range such that the outer rim 34A does not interfere with other components. For instance, an embodiment where outer rim 34A of flange 34 occupies almost the entire interval of the broad face of battery case 12 can be preferably employed. By this means, the pressure-sensitive deformable portion 32 can have the largest possible outer diameter d on the inner diameter side of outer rim 34A of flange 34.

The art disclosed herein can be preferably practiced, for instance, in an embodiment where the flange has an outer diameter a in a range of 5 mm to 100 mm (typically 10 mm to 50 mm). The outer diameter d (see FIG. 4 and FIG. 9) of the pressure-sensitive deformable portion can be smaller, for instance, by about 1 mm to 50 mm than the outer diameter a of the flange. The fact that the outer rim of the flange and the periphery of pressure-sensitive deformable portion are concentric is equivalent to that the flange has a width W of 0.5 mm to 25 mm. The flange usually has a width W of suitably 0.7 mm or larger, or preferably 0.8 mm or larger. The upper limit of the flange width W is not particularly limited. To allow the pressure-sensitive deformable portion to have the largest possible outer diameter d, the width W is suitably 30 mm or smaller, or preferably 20 mm or smaller (e.g. 10 mm or smaller, more preferably smaller than 8 mm, typically 7.5 mm or smaller).

The concavity of the pressure-sensitive deformable portion has a depth c (see FIG. 4 and FIG. 9) of, for instance, about 0.1 mm to 5 mm, or usually suitably about 0.5 mm to 3 mm (typically 0.6 mm to 2.5 mm). Usually, it is suitably about 0.5 mm to 3 mm (typically 0.6 mm to 2.5 mm). A pressure-sensitive deformable portion having such a shape is suitable for bringing about proper snap-through deformation by a pressure rise inside the battery case. As in the example shown in FIG. 9, when a further depression 132C is formed at the center of pressure-sensitive deformable portion 132, the depth c refers to the height from the imaginary center point at the inner diameter side extension of the shape of the curved portion 132B surrounding the depression 132C up to the flange 134.

In a preferable embodiment of the art disclosed herein, the ratio of the pressure-sensitive deformable portion's plate thickness b to the flange's outer diameter a (b/a) is 0.9% to 2.8% (more preferably 1.0% to 2.5%). A pressure-sensitive member satisfying such ratio (b/a) is preferable since it is likely to bring about a sealed secondary battery comprising a current-blocking system that works at an actuation pressure value suitable for a general lithium-ion secondary battery (i.e. a current-blocking system in which a pressure-sensitive deformable portion undergoes snap-through deformation at an internal pressure of the case corresponding to the actuation pressure).

In another preferable embodiment of the art disclosed herein, the ratio of the concavity depth c of the pressure-sensitive deformable portion to the flange's outer diameter a (c/a) is higher than 2.5% (typically 3.0% or higher), or more preferably 3.5% or higher: The upper limit of the ratio (c/a) is not particularly limited as far as the pressure-sensitive deformable portion can undergo snap-through deformation. It is usually suitably 10.0% or lower (typically 8.0% or lower, e.g. 7.0% or lower). A pressure-sensitive member satisfying such ratio (c/a) is preferable since it is likely to bring about a sealed secondary battery comprising a current-blocking system that works at an actuation pressure value suitable for a general lithium-ion secondary battery.

In another preferable embodiment of the art disclosed herein, the ratio of the pressure-sensitive deformable portion's outer diameter d to the flange's outer diameter a (d/a) is 40% or higher, or more preferably 50% or higher. The upper limit of the ratio (d/a) is not particularly limited as far as the pressure-sensitive deformable portion can undergo snap-through deformation. It is usually suitably 100% or lower (e.g. 90% or lower). A pressure-sensitive member satisfying such ratio (d/a) is preferable since it is likely to bring about a sealed secondary battery comprising a current-blocking system that works at an actuation pressure value suitable for a general lithium-ion secondary battery.

A more preferable range of the ratio (d/a) may vary depending on the cross-sectional shape of the portion projecting from the periphery of the pressure-sensitive deformable portion toward the center.

In particular, as in the example shown in FIG. 4, when the cross-sectional shape of the portion extending from the periphery 32A of pressure-sensitive deformable portion 32 toward the center is linear (i.e. when this potion is formed as a tapered portion 32B), the ratio (d/a) is suitably 50% to 95% (typically 60% to 95%, preferably 70% to 95%, more preferably 80% to 95%, e.g. 80% to 90%). For instance, it can be 85% to 90%.

Figure 9:
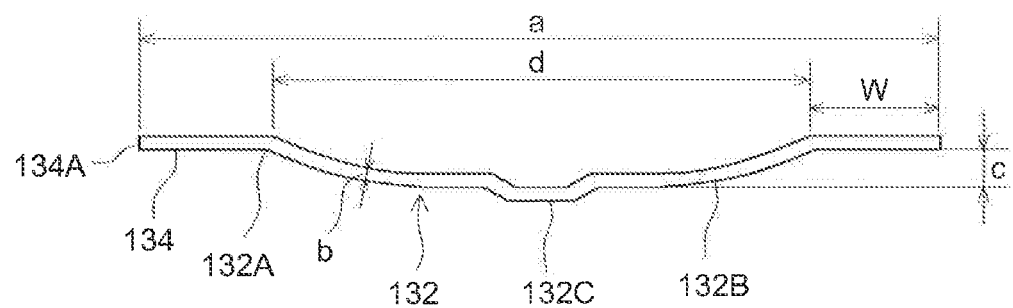
FIG. 9 shows a cross-sectional view illustrating the shape of a pressure-sensitive member in the first state included in a current-blocking system provided to the sealed secondary battery according to the second embodiment.
Figure 10:
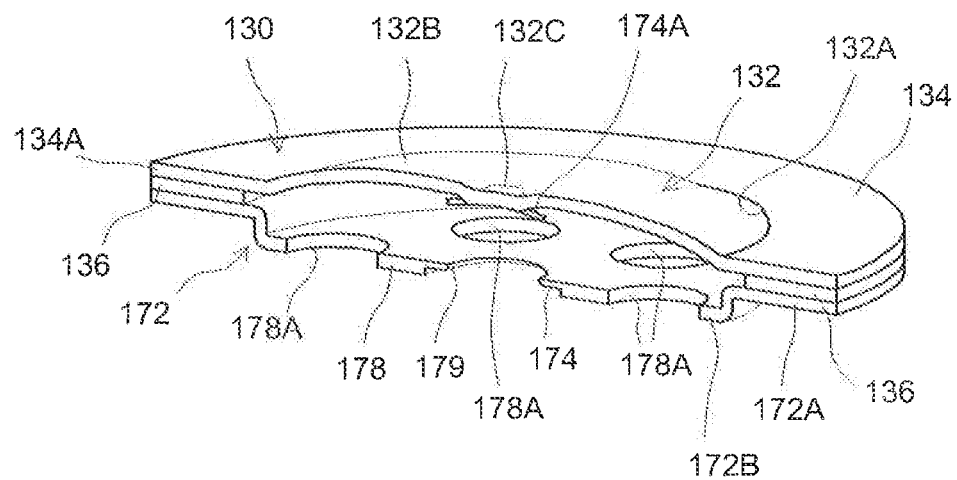
FIG. 10 shows a cross-sectional view schematically illustrating the configuration and state (after blocking of the current) of the current-blocking system provided to the sealed secondary battery according to the second embodiment.

As in the example shown in FIG. 9, when the cross-sectional shape of the portion extending from the periphery 132A of pressure-sensitive deformable portion 132 toward the center is arched (i.e. when this potion is formed as a curved portion 132B in a ball shell form), the ratio (d/a) is suitably 50% to 80% (e.g. 50% to 70%).

The art disclosed herein can be preferably practiced by using a pressure-sensitive member such that at least any two among the ratio values (b/a), (c/a) and (d/a) are both within the preferable numerical ranges described above. The use of a pressure-sensitive member having each of the ratio values (b/a), (c/a) and (d/a) in the preferable range described above is particularly preferable.

In an embodiment where the cross-sectional shape of the portion extending from the periphery of the pressure-sensitive deformable portion toward the center is linear, the angle θ (°) formed by the straight line (i.e. the tapered portion 32B) and flange 34 preferably satisfies tan θ=0.04 to 5.0, or more preferably tan θ=0.05 to 4.5. A pressure-sensitive member in such a shape is suitable for bringing about proper snap-through deformation by a pressure rise inside the battery case.

In such an embodiment, a pressure-sensitive member such that the ratio of the concavity depth c to the pressure-sensitive deformable portion's outer diameter d (c/d) is 4.0% to 10.0% can be preferably used. A pressure-sensitive deformable member with which the ratio (c/d) is 4.5% to 8.0% (e.g. 4.5% to 7.0%) is more preferable. A pressure-sensitive member such that the pressure-sensitive deformable portion has a thickness b larger than 0.15 mm (e.g. 0.2 mm to 0.5 mm) is preferable.

In an embodiment where the cross-sectional shape of the portion extending from the periphery of the pressure-sensitive deformable portion toward the center is arched, the curvature radius e of the arc is usually suitably about 5 mm to 20 mm. For instance, it can be about 10 mm to 15 mm. A pressure-sensitive member in such a shape is suitable for bringing about proper snap-through deformation by a pressure rise inside the battery case.

In such an embodiment, a pressure-sensitive member such that the ratio of the concavity depth c to the pressure-sensitive deformable portion's outer diameter d (c/d) is 7.0% to 10.0% can be preferably used. A pressure-sensitive member such that the ratio (c/d) is 7.0% to 9.5% is more preferable. A pressure-sensitive member such that the pressure-sensitive deformable portion has a thickness b larger than 0.15 mm (e.g. 0.2 mm to 0.5 mm) is preferable.

The aforementioned shapes of preferable pressure-sensitive members (the respective preferable numerical ranges of a, b, c, d and e as well as numerical ranges showing their relationship) can be applied particularly preferably to a pressure-sensitive member made of aluminum or an aluminum alloy (e.g. aluminum materials such as 1000-series including A1050 and the like, 3000-series including A3003 and the like).

As the pressure-sensitive member in the art disclosed herein, can be preferably used a pressure-sensitive member of which at least the pressure-sensitive deformable portion is in an approximate rotational body form. A pressure-sensitive deformable portion in such a shape may receive stress uniformly in the circumferential direction upon a pressure rise inside the case, allowing production of pressure-sensitive deformable portions with smaller deviations of the consistent load-displacement curves. Such a pressure-sensitive member is suitable for constituting a current-blocking system with a precisely-controlled actuation pressure value. It is more preferable that the entire pressure-sensitive member including the pressure-sensitive deformable portion and flange is in an approximate rotational body form.

While specific examples related to the current-blocking system disclosed herein are introduced below, the current-blocking system provided by the present description is not to be limited to the embodiments introduced below.

EXAMPLE 1

Current-blocking system 180 having a constitution shown in FIG. 6 and FIG. 7 were installed in cylindrical main casings 114 to construct test samples A1 to A5. As the pressure-sensitive member 130, species having the shapes indicated in Table 1 were fabricated and used, respectively. For instance, using an aluminum sheet (A1050) having a thickness b of 0.3 mm, the pressure-sensitive member 130 for Sample A1 was fabricated by stamping out a circle from the aluminum sheet and press-molding it into the shape indicated in Table 1. In the pressure-sensitive member 130 for Sample A1, the outer diameter a of flange 134 was 30 mm while the outer diameter d of pressure-sensitive deformable portion 132 was 16 mm. Thus, the width of flange 134 was 7 mm. The depth c of the concavity formed by pressure-sensitive deformable portion 132 was 1.2 mm. The curved portion 132B was in a ball shell shape having a curvature radius e of 10.5 mm. At the central portion of pressure-sensitive deformable portion 132, a depression 132C having 5 mm outer diameter was formed. Pressure-sensitive members 130 for Samples A2 to A5 were fabricated in the same manner. It is noted that as the pressure-sensitive members for Samples A4 and A5, were used species such that the portions corresponding to the curved portions 132B of pressure-sensitive members for Samples A1 to A3 were formed as tapered portions narrowing from the flange 134 of pressure-sensitive member 130 toward the center thereof (which can be understood as a curved portion having an infinite curvature radius e).

A total of five different pressure-sensitive members 130 thus fabricated were layered with spacers 136 and conductive plates 172, respectively. When layering, the outer surface of depression 132C was fit in the inner circumference of gas vent 174A, and the seam was welded. The outer circumferences of these members were crimped and fastened via insulating member 126 on the opening of main casing 114. This hermetically sealed the space inside the main casing 114. As the conductive plate 172, was used an aluminum (A1050) plate having a thin portion 174 of 0.15 mm thickness and an annular groove (notch) of 4.6 mm diameter circularly formed around gas vent 174A located at the center of the thin portion 174. Groove 179 was V-shaped in cross section and was 100 μm deep. Thus, the thickness of the thin portion 174 at the widthwise center of groove 179 (or the "remaining thickness" hereinafter) was 50 μm.

A displacement sensor was attached to the central portion of pressure-sensitive member 130 (more specifically, to the periphery of depression 132C). The curved portion 132B of pressure-sensitive member 130 and the thick portion 178 of conductive plate 172 were attached to a tester to detect conduction between the two members 130 and 172. At 25° C. ambient temperature, via a through hole (not shown in the drawings) made in main casing 114, air was supplied into the main casing 114 to gradually increase the internal pressure of the case (at a rate of about 0.6 MPa/min). The air supply was continued until the conduction between the two members 130 and 172 was lost. During this, the displacement sensor was used to observe the displacement behavior of the central portion of pressure-sensitive deformable portion 132 to determine whether or not snap-through deformation took place. The results are shown in Table 1. In the cells for the "Occurrence of snap-through", "Yes" indicates that snap-through deformation was confirmed while "No" indicates that snap-through deformation was not detected. Additionally, the internal pressure of the case was recorded when the conduction between pressure-sensitive member 130 and conductive plate 172 was lost (corresponding to the actuation pressure of the current-blocking system).

TABLE 1

| Sample | A1 | A2 | A3 | A4 | A5 |
|---|---|---|---|---|---|
| a (mm) | 30 | 30 | 30 | 18 | 26 |
| b (mm) | 0.3 | 0.4 | 0.5 | 0.15 | 1.15 |
| c (mm) | 1.2 | 1.5 | 1.8 | 0.40 | 0.65 |
| d (mm) | 16 | 18 | 20 | 6 | 10 |

TABLE 1-continued

| Sample | A1 | A2 | A3 | A4 | A5 |
|---|---|---|---|---|---|
| e (mm) | 10.5 | 12.5 | 14.5 | — | — |
| b/a (%) | 1.00 | 1.33 | 1.67 | 0.83 | 0.58 |
| c/a (%) | 4.0 | 5.0 | 6.0 | 2.22 | 2.50 |
| d/a (%) | 53.3 | 60.0 | 66.7 | 33.3 | 38.5 |
| e/a (%) | 35.0 | 41.7 | 48.3 | — | — |
| Occurrence of snap-through | Yes | Yes | Yes | No | No |

As shown in this table, in Samples A1 to A3 each comprising a pressure-sensitive member having a preferable shape described earlier, snap-through phenomenon of the pressure-sensitive deformable portion's shape was observed. On die contrary, with respect to Samples A4 and A5, without their pressure-sensitive deformable portions exhibiting snap-through deformation, the connection was lost.

Figure 12:
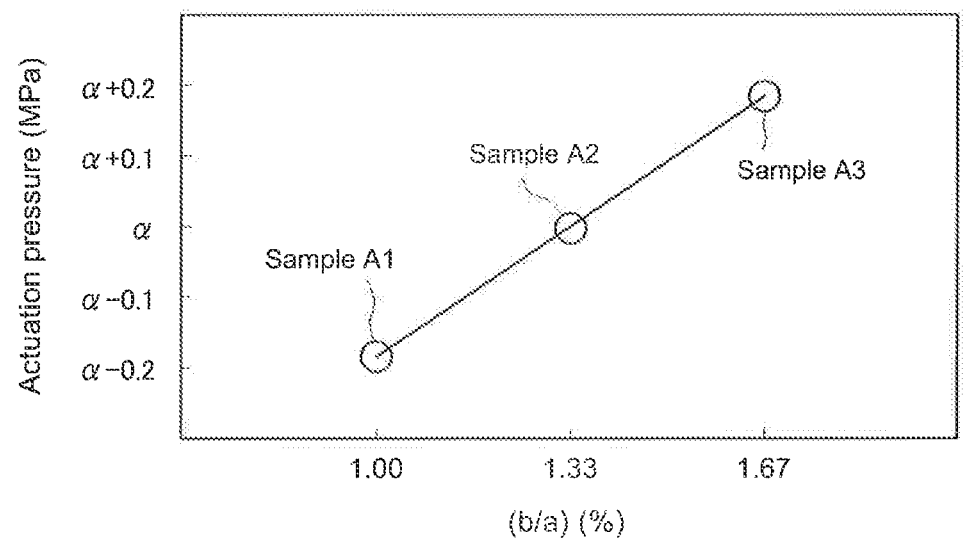
FIG. 12 shows a characteristic plot representing the relationship of the shape of pressure-sensitive member vs. the actuation pressure of current-blocking systems.

FIG. 12 shows a plot of the actuation pressure recorded in the test versus the value of b/a with respect to Samples A1, A2 and A3. In the plot, α (MPa) at the vertical axis corresponds to the actuation pressure of Sample A2. The actuation pressure of α+0.1 (MPa) indicates an actuation pressure higher by 0.1 (MPa) than the actuation pressure a (MPa) of Sample A2. As shown in the plot, in Samples A1 to A3 used here, the value of b/a and the actuation pressure had a linear relationship. This result supports that by adjusting the pressure-sensitive member's shape (in this experiment, the thickness b of the pressure-sensitive deformable portion), the actuation pressure can be properly controlled.

EXAMPLE 2

Current-blocking systems 80 having a constitution shown in FIG. 3 were installed in square battery cases 12 shown in FIG. 1 to construct test Samples B1 to B8. As the pressure-sensitive members 30, were used those having the respective values of ratios (b/a), (c/a), (d/a) and tan θ shown in Table 2, respectively. For each of Samples B1 to B8, the value of a was in a range of 14 mm to 20 mm while b was in a range of 0.2 mm to 0.5 mm.

With respect to each of a total of eight different pressure-sensitive members 30 thus fabricated, flange 34 was fastened on the end portion 28A of pressure-sensitive member holder 28 while the flat portion 32C of pressure-sensitive deformable portion 32 was welded by laser to the thin portion 74 of current collector plate 72 on the inner side (inner diameter side) relative to the position of groove 79. These members were mounted on a sealing plate 16, and the seam between the sealing plate 16 and main casing 14 was welded by laser. This hermetically sealed the space inside the battery case 12. As the conductive plate 72, was used an aluminum alloy (A3003) plate having a thin portion 74 of 0.12 mm thickness and an annular groove (notch) of 3.6 mm diameter circularly formed around gas vent 74A located at the center of the thin portion 74. Groove 79 was V-shaped in cross section and was 70 μm deep. Thus, the thickness of the thin portion 74 at the widthwise center of groove 79 (or the "remaining thickness" hereinafter) was 50 μm.

TABLE 2

| Sample | B1 | B2 | B3 | B4 | B5 | B6 | B7 | B8 |
|---|---|---|---|---|---|---|---|---|
| b/a (%) | 1.11 | 1.50 | 1.67 | 2.14 | 2.50 | 1.88 | 2.90 | 1.67 |
| c/a (%) | 4.4 | 3.0 | 4.4 | 5.7 | 5.7 | 5.0 | 5.7 | 1.1 |

TABLE 2-continued

| Sample | B1 | B2 | B3 | B4 | B5 | B6 | B7 | B8 |
|---|---|---|---|---|---|---|---|---|
| d/a (%) | 88.9 | 90.0 | 88.9 | 85.7 | 85.7 | 87.5 | 85.7 | 88.9 |
| tan θ | 0.12 | 0.12 | 0.08 | 1.73 | 0.18 | 4.00 | 5.70 | 0.03 |
| Occurrence of snap-through | Yes | Yes | Yes | Yes | Yes | Yes | No | No |

As shown in this table, in Samples B1 to B6 each comprising a pressure-sensitive member having a preferable shape described earlier, snap-through phenomenon of the pressure-sensitive deformable portion's shape was observed. On the contrary, with respect to Samples B7 and B8, without their pressure-sensitive deformable portions exhibiting snap-through deformation, the connection was lost.

EXAMPLE 3

Figure 11:
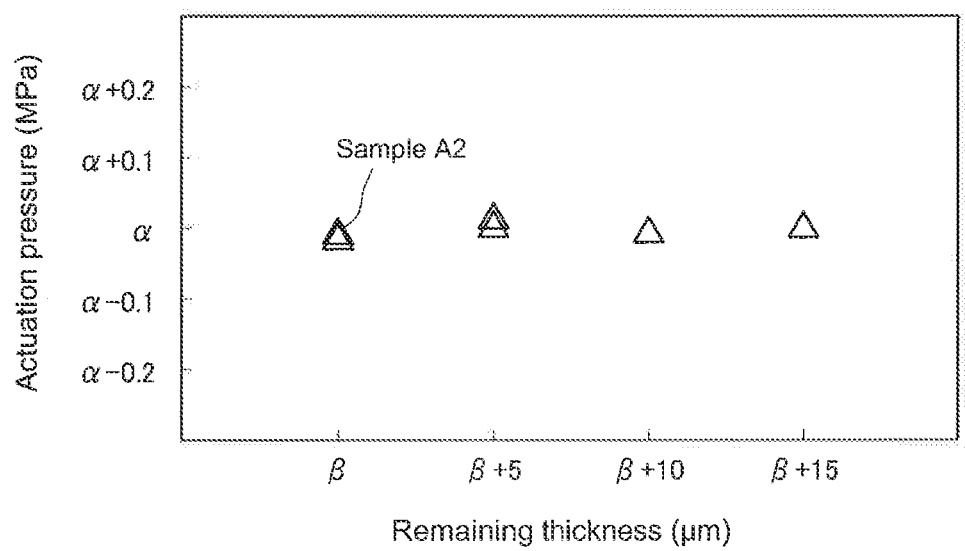
FIG. 11 shows a characteristic plot representing the relationship of the groove depth (remaining thickness) vs. the actuation pressure of a current-blocking system.

By adjusting the depth of groove 179 formed in the thin portion 174 of conductive plate 172 in the current-blocking system according to Sample A2, a conductive plate having a remaining thickness larger by 5 μm than the remaining thickness β (μm) of the conductive plate used in Sample A2 (i.e. a conductive plate having a remaining thickness of β+5 μm, i.e., having a depth of groove 179 smaller by 5 μm than that of the conductive plate of Sample A2), a conductive plate having a remaining thickness larger by 10 μm (remaining thickness of β+10 μm), and a conductive plate having a remaining thickness larger by 15 μm (remaining thickness β+15 μm) were fabricated. In the same manner as Example 1 except that these conductive plates were used, test samples were fabricated. In the same manner as Example 1, air was supplied into the case of each test sample to increase the internal pressure of the case. Additionally, when the conduction between pressure-sensitive member 130 and conductive plate 172 was lost, the internal pressure of the case was recorded. The results are shown in FIG. 11. In FIG. 11, β (μm) at the horizontal axis indicates the remaining thickness of the conductive plate of Sample A2 while a (MPa) at the vertical axis indicates the actuation pressure of Sample A2.

As shown in FIG. 11, it was confirmed that even when the remaining thickness of the conductive plate varied by about 15 μm from the standard value β (μm), the actuation pressure was maintained approximately constant. This effect is produced by the current-blocking system being configured so that the actuation pressure is determined mainly by the tendency of pressure-sensitive deformable portion 132 to undergo snap-through deformation (by the pressure value that causes snap-through deformation). This result supports that the current-blocking system can greatly eliminate influences on the actuation pressure caused by variances of the depth of groove 179 (i.e. variances of the remaining thickness).

EXAMPLE 4

The current-blocking system of Sample B1 was replaced with a system according to conventional art to obtain Sample B0. Sample B0 comprises a current-blocking system such that the actuation pressure is controlled by the remaining thickness of a groove made in the thin portion of the current collector plate. Before the current-blocking system according to Sample B0 is actuated, the pressure-sensitive member has a flat shape (i.e. tan θ=0, c=0). In the current-blocking system according to Sample B0, when the internal pressure of the case increases, the flat pressure-sensitive member breaks off the thin portion at the groove and undergoes deformation, whereby the current is blocked. This deformation is not associated with snap-through action.

Figure 13:
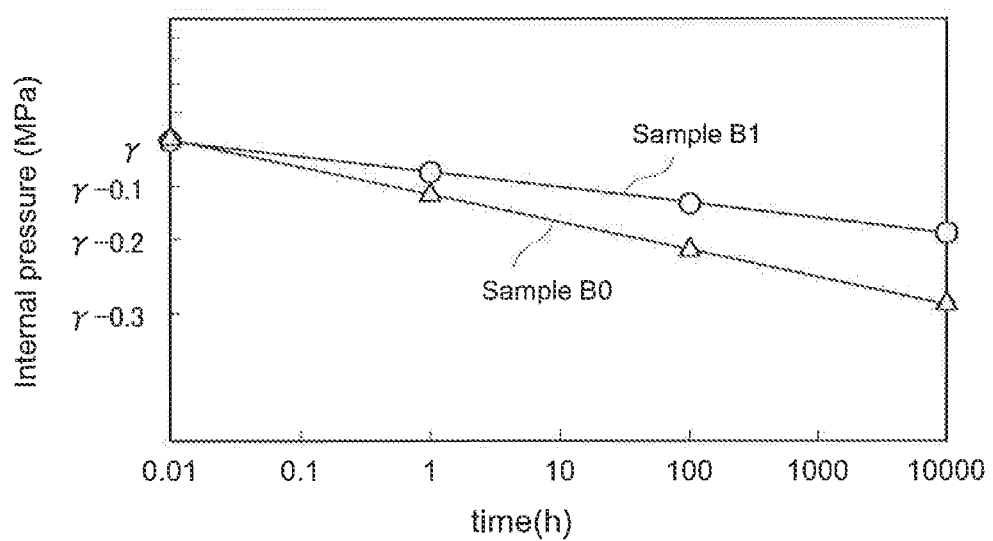
FIG. 13 shows a characteristic plot representing the relationship of the internal pressure of the battery case vs. the time taken until actuation of the current-blocking system at the internal pressure.

Several pieces of Sample B0 and Sample B1 were obtained, respectively. To create creep by subjecting the current collector plate to the internal pressure of the case, air was injected into these samples and the internal pressure of the case was adjusted lower by 0.1 MPa to 0.3 MPa than the designed actuation pressure (initial value of actuation pressure) γ of the current-blocking system. The internal pressure of the case was maintained at the adjusted pressure value for each sample, and the time required for actuation of the current-blocking system (i.e. the time taken until the conduction between the pressure-sensitive member and conductive plate was lost) was recorded. FIG. 13 shows the resulting plot showing the time required for actuation of the current-blocking system on the horizontal axis and the adjusted pressure (adjusted internal pressure) on the vertical axis.

As evident from FIG. 13, when compared to Sample B0, in Sample B1, even when the internal pressure of the case stayed at a high level in a range lower than the designed actuation pressure γ, this influenced the accuracy of actuation of the current-blocking system clearly to a smaller extent. More specifically, for instance, although the difference between the internal pressure adjusted to be actuated after 10000 hours and the designed actuation pressure γ was nearly about 0.3 MPa in Sample B0, in Sample B1, the difference was smaller by 30% as compared to Sample B0. Presumably, such results were obtained because in Sample B1, the actuation pressure of the current-blocking system was determined mainly by the tendency of pressure-sensitive deformable portion 32 to undergo snap-through deformation, and thus even when the internal pressure of the case stayed at a high level to cause fatigue or creep in current collector plate 72, it hardly affected the actuation pressure.

As described above, the present description provides a sealed secondary battery (typically, a sealed secondary battery having a square outer shape, e.g. a lithium-ion secondary battery) comprising a current-blocking system, such that the current-blocking system yields little change in the actuation pressure even on long-term use. Such a sealed secondary battery is preferable as a power supply for driving a vehicle. Accordingly, the present description provides, for example, a multi-cell battery 100 as schematically illustrated in FIG. 18.

Figure 18:
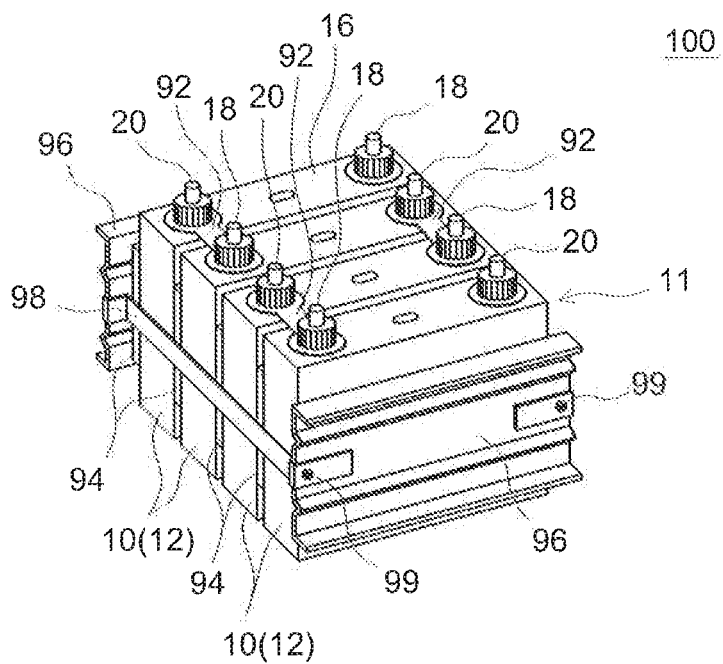
FIG. 18 shows a perspective view illustrating the configuration of a multi-cell battery according to an embodiment.

More specifically, as shown in FIG. 18, with a sealed secondary battery (typically a square lithium secondary battery as shown in the drawing) 10 that comprises a current-blocking system (see FIG. 2 to FIG. 5 described above) disclosed herein being a single cell, a plurality (four in the embodiment outlined, but not limited to this) of the single cells 10 are arranged to constitute a multi-cell battery 100. Typically, as shown in the drawing, it is constructed such that the respective single cells 10 are electrically connected in series. More specifically, the top face (i.e. sealing plate) 16 of battery case 12 of each single cell 10 is provided with a positive terminal 20 electrically connected to the positive electrode of an electrode unit housed in case 12, and a negative terminal 18 electrically connected to the negative electrode of the electrode unit. Between adjacent single cells 10, positive terminal 20 of one cell and negative terminal 18 of the other cell are electrically connected with a suitable connecting means 92. To the both sides of a group 11 of single cells including the plurality of single cells 10 arranged as described above, end plates 96 are attached, respectively, and to crosslink the pair of end plates 96 and 96, beams 98 are attached along the arranged direction to both the side faces of single cell group 11. The respective ends of beams 98 are fastened tightly on end plates 96 with screws 99. The respective single cells 10 are connected in series like this are restricted (fastened) to construct a multi-cell battery 100 having a desirable voltage, as a power supply to drive a vehicle.

In a preferable embodiment of multi-cell battery 100, as shown in FIG. 18, in between the respective single cells 10 arranged in a prescribed direction, space holding sheets 94 are placed. It is preferable that such space holding sheet 94 is made of a material (e.g. made of a highly heat-conductive metal or made of a lightweight and hard synthetic resin such as polypropylene) and/or has a shape, such that it is capable of serving as a heat-releasing member to release the heat generated inside each single cell 10 when in use.

Figure 19:
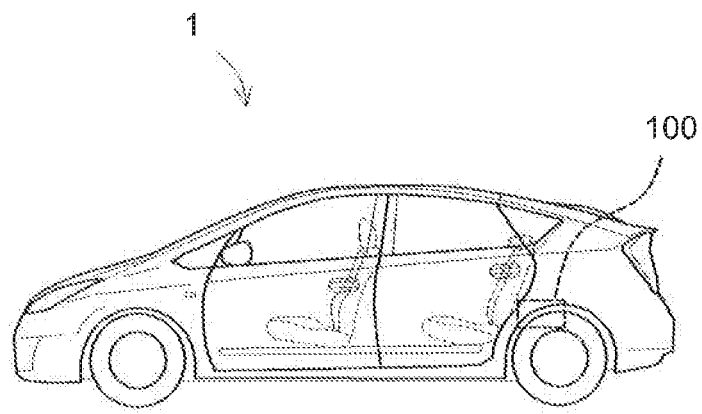
FIG. 19 shows a perspective view schematically illustrating a vehicle (automobile) comprising a multi-cell battery according to an embodiment.

This description also provides a sealed secondary battery (typically a lithium-ion secondary battery having a square outer shape) comprising a current-blocking system disclosed herein with high output power and large capacity (typically a one-hour rate capacity of 5 Ah or higher, e.g. 5 Ah to 20 Ah, or 20 Ah or higher (e.g. 20 Ah to 30 Ah)). There is also provided a multi-cell battery 100 with such a sealed secondary battery being a single cell. As shown in FIG. 19, it can provide a vehicle 1 (typically an automobile comprising a driving motor, such as an electric automobile, hybrid automobile, plug-in hybrid automobile, fuel cell automobile) comprising the multi-cell battery 100 as the driving power supply.

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST 1 vehicle
10, 110 sealed secondary batteries (lithium-ion secondary batteries)
12, 112 battery cases
14, 114 main casings
16 sealing plate (lid)
18 negative terminal
20 positive terminal
22 connecting terminal
26, 126 insulating members
28 pressure-sensitive member holder
28A end portion
28B recess
30, 130 pressure-sensitive members (first conductive members)
32, 132 pressure-sensitive deformable portions (concavities)
32A, 132A peripheries
32B tapered portion
32C flat portion
132B curved portion
132C depression
34, 134 flanges
34A, 134A outer rims
136 spacer
50 wound electrode unit
52 positive electrode sheet (positive electrode)
52A margin
70 positive current collector (second conductive member)

72 current collector plate
172 conductive plate (second conductive member)
172A outer border
172B central portion
74, 174 thin portions
74A, 174A gas vents
77A gas vent
78, 178 thick portions
78A, 178A gas vents
79, 179 grooves (notches)
80, 180 current-blocking systems
100 multi-cell battery

The invention claimed is:

1. A sealed secondary battery comprising
a positive electrode,
a negative electrode,
a battery case housing the positive electrode and the negative electrode,
an electrode terminal electrically connected to either the positive electrode or negative electrode and exposed outside the battery case, and
a current-blocking system that is actuated by a pressure rise inside the battery case to disconnect conduction path between the electrode and the electrode terminal, wherein
the current-blocking system comprises a pressure-sensitive member having a pressure-sensitive deformable portion in a plate form, which deforms from a first state via snap-through deformation to a second state upon a pressure rise inside the battery case, the pressure-sensitive member being configured to return from the second state to the first state,
the pressure-sensitive member comprises a flange projecting outwards from the periphery of the pressure-sensitive deformable portion, and when in the first state, the pressure-sensitive deformable portion forms a concavity curving inward toward inside of the battery from the flange,
the pressure-sensitive deformable portion has a circular periphery,
the flange has a circular outer rim,
the flange has an outer diameter a, the pressure-sensitive member has a thickness b in the pressure-sensitive deformable portion, the concavity has a depth c, and the pressure-sensitive deformable portion has an outer diameter d, satisfying the next relationships:
(1) b/a is 1.0% to 2.5%,
(2) c/a is 3.0% to 7.0%, and
(3) d/a is 50% to 90%,
the depth c of the concavity is at least 1.2 mm,
the battery is configured to disconnect the conduction path by separation of bonding or breaking off in the conduction path associated with snap-through deformation of the pressure-sensitive deformable portion,
the current-blocking system comprises a first conductive member and a second conductive member,
the conduction path is constituted to include the first conductive member and the second conductive member,
when the pressure-sensitive deformable portion is in the first state, the first conductive member is in direct connection to the second conductive member,
with the current-blocking system being configured to disconnect the conduction between the first conductive member and second conductive member by snap-through deformation of the pressure-sensitive deformable portion,
the pressure-sensitive deformable portion is provided to the first conductive member,
the pressure-sensitive deformable portion in the first state is joined to the second conductive member by welding, and
in the second conductive member, an annular groove that prescribes a location at which the second conductive member breaks off upon snap-through deformation of the pressure-sensitive deformable portion is present around a location to which the pressure-sensitive deformable portion is joined.

2. The sealed secondary battery according to claim 1, wherein
the pressure-sensitive deformable portion comprises a tapered portion narrowing from the periphery of the pressure-sensitive deformable portion toward the center thereof, and
the flange and the tapered portion form an angle θ satisfying tan θ=0.04 to 5.0.

3. The sealed secondary battery according to claim 1, wherein
the pressure-sensitive deformable portion is formed to have, in cross section, a dome shape curved inward toward inside of the battery.

4. The sealed secondary battery according to claim 3, wherein the cross section of the dome shape is arched, a curvature radius e of the arc is 10 mm to 15 mm.

5. The sealed secondary battery according to claim 1, wherein
the pressure-sensitive member has a thickness b larger than 0.15 mm in the pressure-sensitive deformable portion.

6. A battery for driving a vehicle, comprising the sealed secondary battery according to claim 1.

7. The sealed secondary battery according to claim 1, wherein the pressure-sensitive member has a thickness b of 0.3 mm or larger.

8. The sealed secondary battery according to claim 7, wherein the dome shape of the pressure-sensitive deformable portion is the shape of a section cut out of a spherical shell.

9. The sealed secondary battery according to claim 1, wherein the pressure-sensitive member has a thickness b of 0.4 mm or larger.

10. The sealed secondary battery according to claim 1, where the current-blocking system is provided at a positive electrode side, and the pressure-sensitive member is made of aluminum or an aluminum alloy.

11. The sealed secondary battery according to claim 1, wherein a thickness of the second conductive member at a widthwise center of the groove is 50 μm to 65 μm.

12. A sealed secondary battery comprising
a positive electrode,
a negative electrode,
a battery case housing the positive electrode and the negative electrode,
an electrode terminal electrically connected to either the positive electrode or negative electrode and exposed outside the battery case, and
a current-blocking system that is actuated by a pressure rise inside the battery case to disconnect conduction path between the electrode and the electrode terminal, wherein
the current-blocking system comprises a pressure-sensitive member having a pressure-sensitive deformable portion in a plate form, which deforms from a first state via snap-through deformation to a second state upon a pressure rise inside the battery case, the pressure-sensitive member being configured to return from the first state to the second state, the pressure-sensitive member comprises a flange projecting outwards from the periphery of the pressure-sensitive deformable portion, and when in the first state, the pressure-sensitive deformable portion forms a concavity curving inward toward inside of the battery from the flange, the pressure-sensitive deformable portion has a circular periphery, the pressure-sensitive deformable portion is formed to have, in cross section, a dome shape curved inward toward inside of the battery, the battery is configured to disconnect the conduction path by separation of bonding or breaking off in the conduction path associated with snap-through deformation of the pressure-sensitive deformable portion, the current-blocking system comprises a first conductive member and a second conductive member, the conduction path is constituted to include the first conductive member and the second conductive member, when the pressure-sensitive deformable portion is in the first state, the first conductive member is in direct connection to the second conductive member, with the current-blocking system being configured to disconnect the conduction between the first conductive member and second conductive member by snap-through deformation of the pressure-sensitive deformable portion, the pressure-sensitive deformable portion is provided to the first conductive member, the pressure-sensitive deformable portion in the first state is joined to the second conductive member by welding, and in the second conductive member, an annular groove that prescribes a location at which the second conductive member breaks off upon snap-through deformation of the pressure-sensitive deformable portion is present around a location to which the pressure-sensitive deformable portion is joined.

13. The sealed secondary battery according to claim 12, wherein the pressure-sensitive member has a thickness b of 0.3 mm or larger.

14. The sealed secondary battery according to claim 12, wherein the pressure-sensitive member has a thickness b of 0.4 mm or larger.

15. The sealed secondary battery according to claim 12, where the current-blocking system is provided at a positive electrode side, and the pressure-sensitive member is made of aluminum or an aluminum alloy.

16. The sealed secondary battery according to claim 12, wherein a thickness of the second conductive member at a widthwise center of the groove is 50 μm to 65 μm.

17. The sealed secondary battery according to claim 12, wherein the cross section of the dome shape is arched, a curvature radius e of the arc is 10 mm to 15 mm.

* * * * *